US011881338B2

(12) United States Patent
Kumaoka et al.

(10) Patent No.: US 11,881,338 B2
(45) Date of Patent: Jan. 23, 2024

(54) SOFT MAGNETIC ALLOY AND MAGNETIC COMPONENT

(71) Applicant: TDK CORPORATION, Tokyo (JP)

(72) Inventors: Hironobu Kumaoka, Tokyo (JP); Kazuhiro Yoshidome, Tokyo (JP); Akito Hasegawa, Tokyo (JP); Satoko Mori, Tokyo (JP)

(73) Assignee: TDK CORPORATION, Tokyo (JP)

( * ) Notice: Subject to any disclaimer, the term of this patent is extended or adjusted under 35 U.S.C. 154(b) by 160 days.

(21) Appl. No.: 17/672,258

(22) Filed: Feb. 15, 2022

(65) Prior Publication Data

US 2022/0319749 A1 Oct. 6, 2022

(30) Foreign Application Priority Data

Mar. 31, 2021 (JP) ................................ 2021-061037

(51) Int. Cl.
*H01F 1/147* (2006.01)
*H01F 1/153* (2006.01)
(Continued)

(52) U.S. Cl.
CPC ....... *H01F 1/15316* (2013.01); *C22C 38/002* (2013.01); *C22C 38/02* (2013.01);
(Continued)

(58) Field of Classification Search
CPC .. H01F 1/15316; H01F 1/15333; H01F 1/147; H01F 27/24; C22C 38/002;
(Continued)

(56) References Cited

U.S. PATENT DOCUMENTS

2007/0175545 A1 8/2007 Urata et al.
2007/0258842 A1* 11/2007 Lu ...................... H01F 1/15308 419/10
2017/0294254 A1 10/2017 Urata et al.

FOREIGN PATENT DOCUMENTS

JP 2007107094 A * 4/2007 ............ B22D 11/06
JP 2007-231415 A 9/2007
(Continued)

OTHER PUBLICATIONS

English machine translation of JP 2007-107094 A of Yoshizawa (Year: 2007).*

*Primary Examiner* — Jophy S. Koshy
(74) *Attorney, Agent, or Firm* — Oliff PLC

(57) ABSTRACT

A soft magnetic alloy comprising an internal area having a soft magnetic type alloy composition including Fe and Co, a Co concentrated area existing closer to a surface side than the internal area and having a higher Co concentration than in the internal area, a SB concentrated area existing closer to the surface side than the Co concentrated area and having a higher concentration of at least one element selected from Si and B than in the internal area, and a Fe concentrated area including Fe existing closer to the surface side than the SB concentrated area; wherein a crystalized area ratio of the SB concentrated area represented by $S_{SB}^{cry}/S_{SB}$ and a crystalized area ratio of the Fe concentrated area represented by $S_{Fe}^{cry}/S_{Fe}$, satisfy a relation of $(S_{SB}^{cry}/S_{SB})<(S_{Fe}^{cry}/S_{Fe})$.

8 Claims, 8 Drawing Sheets

(51) Int. Cl.
*C22C 38/30* (2006.01)
*C22C 38/00* (2006.01)
*C22C 38/02* (2006.01)
*C22C 38/32* (2006.01)

(52) U.S. Cl.
CPC .............. *C22C 38/30* (2013.01); *C22C 38/32* (2013.01); *C22C 2202/02* (2013.01)

(58) Field of Classification Search
CPC ......... C22C 38/02; C22C 38/30; C22C 38/32; C22C 2202/02
See application file for complete search history.

(56) References Cited

FOREIGN PATENT DOCUMENTS

| | | | |
|---|---|---|---|
| JP | 2009-293099 | A | 12/2009 |
| JP | 2014-167139 | A | 9/2014 |

* cited by examiner

SOFT MAGNETIC ALLOY AND MAGNETIC COMPONENT

TECHNICAL FIELD

The present disclosure relates to a soft magnetic alloy, and a magnetic component using the soft magnetic alloy.

BACKGROUND

As a magnetic material used for various magnetic components such as an inductor and the like, soft magnetic alloys shown in Patent Documents 1 to 3 are known. These soft magnetic alloys have a higher saturation magnetic flux density than a ferrite material, and exhibits good soft magnetic properties. Note that, occasionally, corrosion such as rust and the like may be formed to a soft magnetic alloy, thus an improved corrosion resistant of the soft magnetic alloy was demanded.

[Patent Document 1] Patent Application Laid Open No. 2009-293099

[Patent Document 2] Patent Application Laid Open No. 2007-231415

[Patent Document 3] Patent Application Laid Open No. 2014-167139

SUMMARY

The present disclosure is achieved in view of such circumstances, and the object is to provide a soft magnetic alloy having a high corrosion resistance, and a magnetic component using the soft magnetic alloy.

A soft magnetic alloy includes an internal area having a soft magnetic type alloy composition including Fe and Co,

- a Co concentrated area existing closer to a surface side than the internal area and having a higher Co concentration than in the internal area,
- a SB concentrated area existing closer to the surface side than the Co concentrated area and having a higher concentration of at least one element selected from Si and B than in the internal area, and
- a Fe concentrated area including Fe existing closer to the surface side than the SB concentrated area; wherein
- a crystalized area ratio of the SB concentrated area represented by $S_{SB}^{cry}/S_{SB}$ and a crystalized area ratio of the Fe concentrated area represented by $S_{Fe}^{cry}/S_{Fe}$ satisfy a relation of $(S_{SB}^{cry}/S_{SB})<(S_{Fe}^{cry}/S_{Fe})$.

As a result of keen study by the present inventors, the soft magnetic alloy satisfying the above-described characteristics can suppress rust formation when it is immersed in water, thus a corrosion resistance is improved.

Preferably, the SB concentrated area may include an amorphous oxide phase.

Preferably, the Co concentrated area may include a metal phase.

Preferably, a Co concentration degree of the Co concentrated area may be larger than 1.2.

Preferably, an amorphous degree of the soft magnetic alloy may be 85% or more.

The soft magnetic alloy according to claim may be a ribbon form or a powder form.

The use of the soft magnetic alloy of the present disclosure is not particularly limited, and for example, it can be used for various coil components such as an inductor and the like, a filter, and various magnetic components such as an antenna, and the like. Among the above-mentioned uses, the soft magnetic alloy of the present disclosure is suitable as a material for a magnetic core in the coil component and the like.

FIG. A is a cross section showing a soft magnetic alloy 1*b* according to an embodiment of the present disclosure.

Figure 4A:
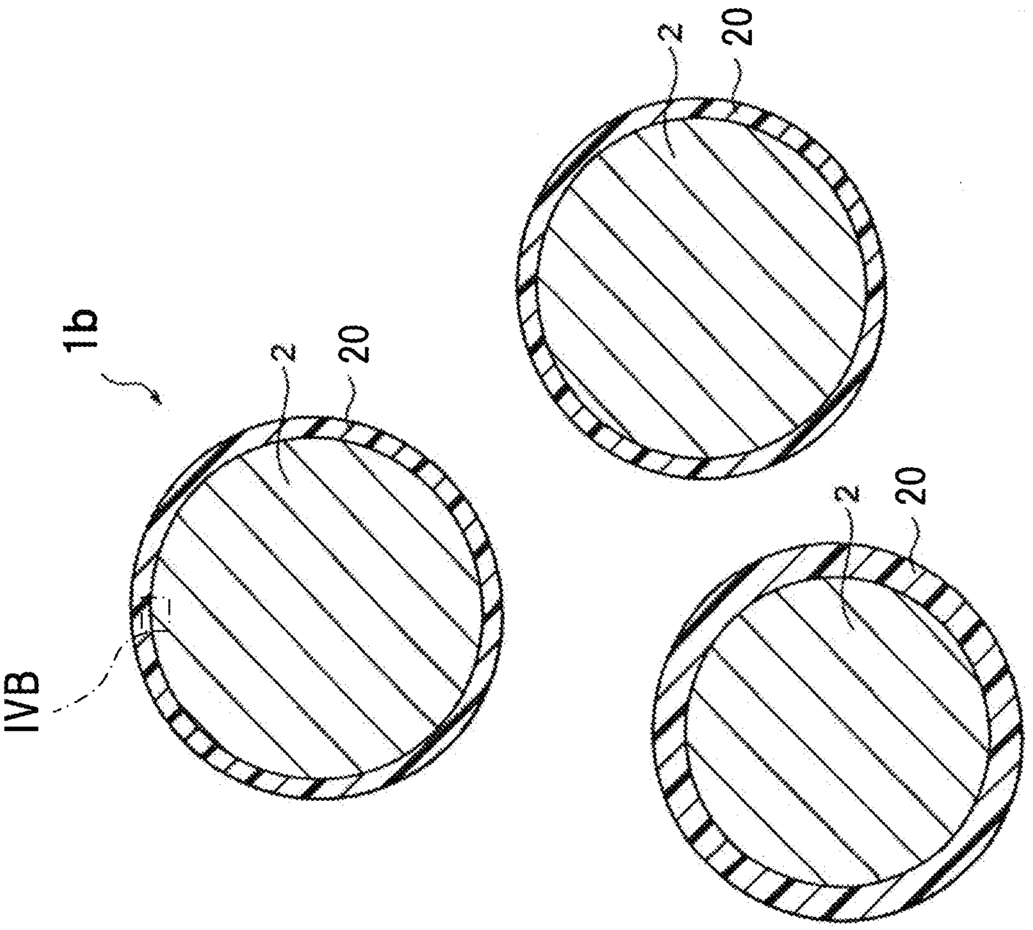
Figure 4B:
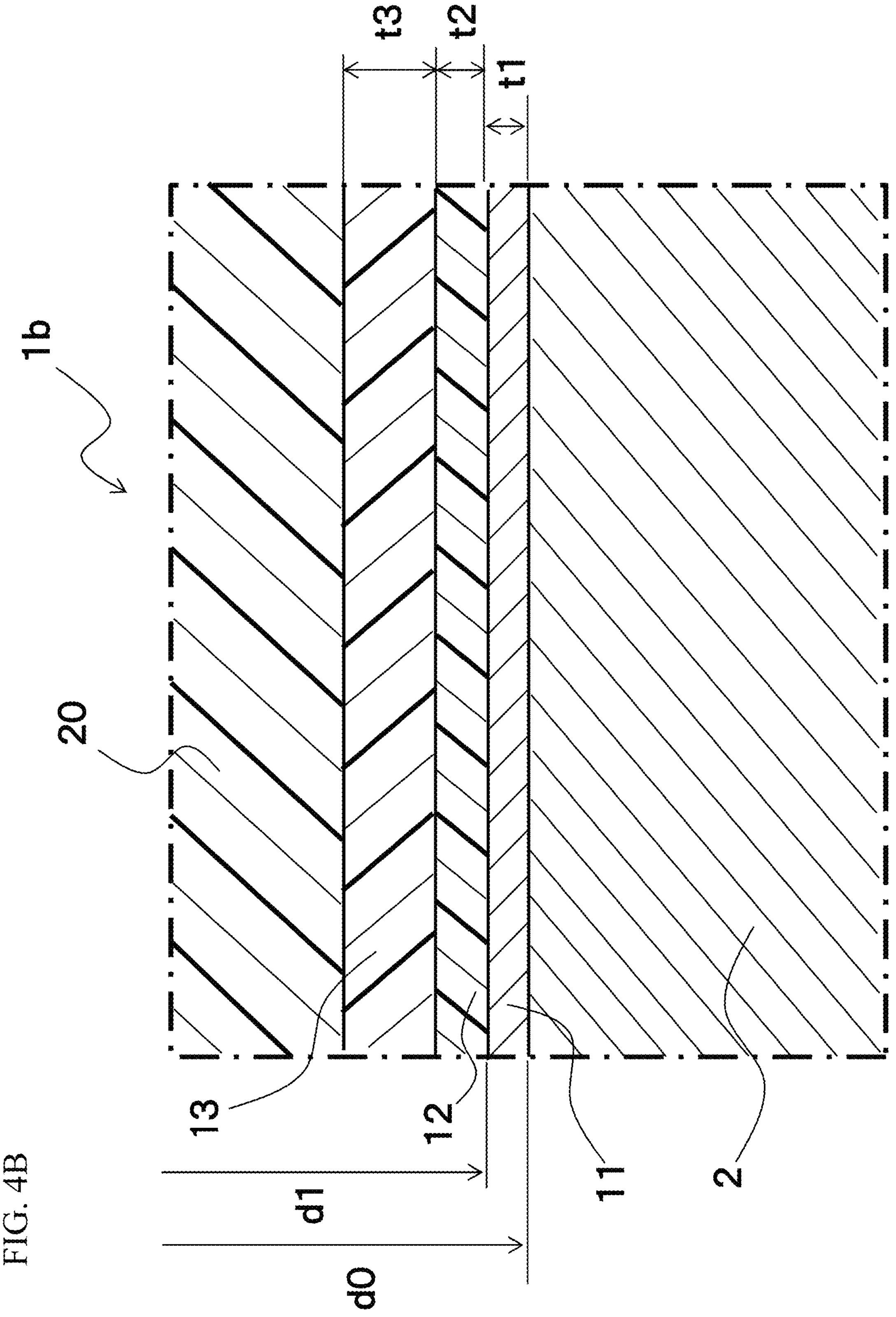

FIG. 4B is an enlarged cross section of an area IVB shown in FIG. 4A.

Figure 1:
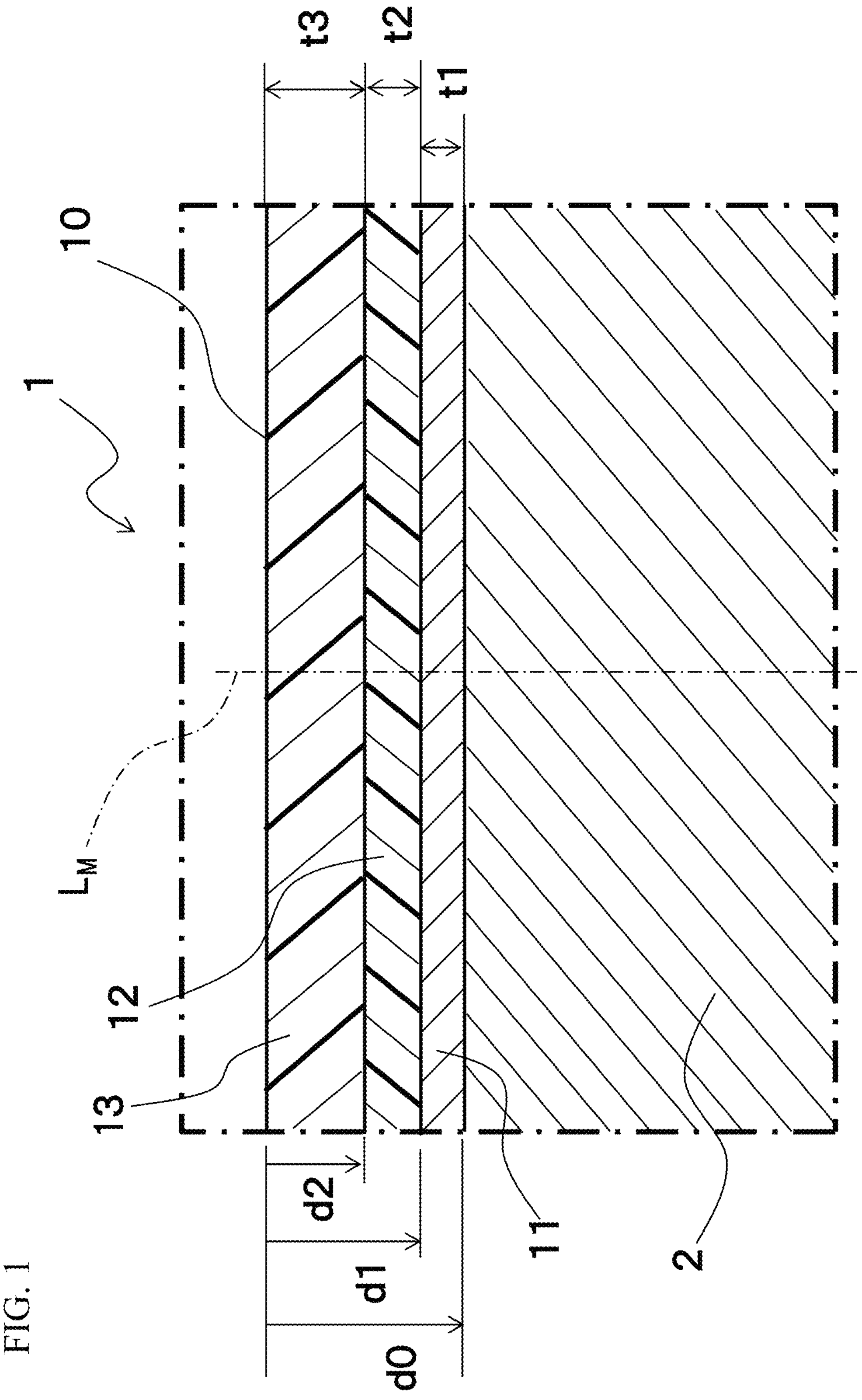
FIG. 1 is an enlarged cross section of an essential part of a soft magnetic alloy 1 according to an embodiment of the present disclosure.
Figure 5A:
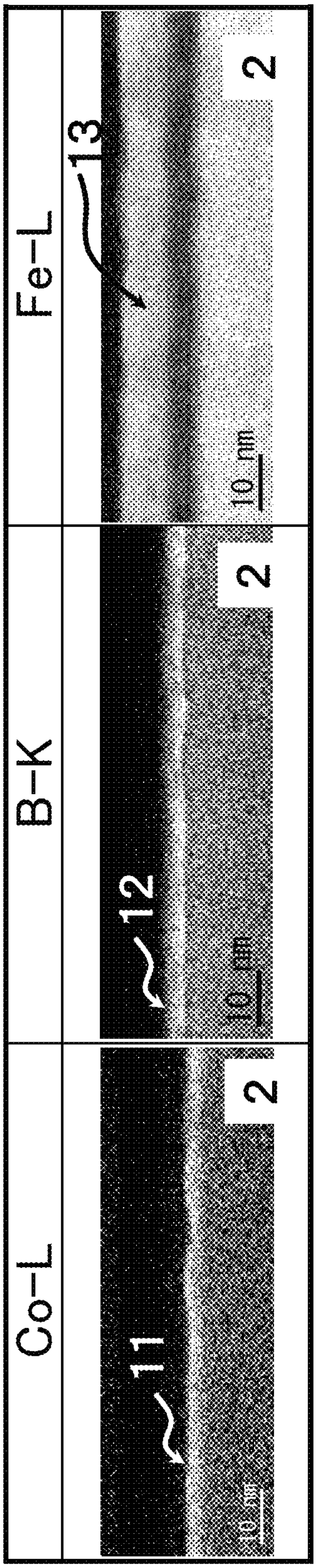

FIG. 5A is an example of an EELS image of the soft magnetic alloy 1 shown in FIG. 1.

Figure 5B:
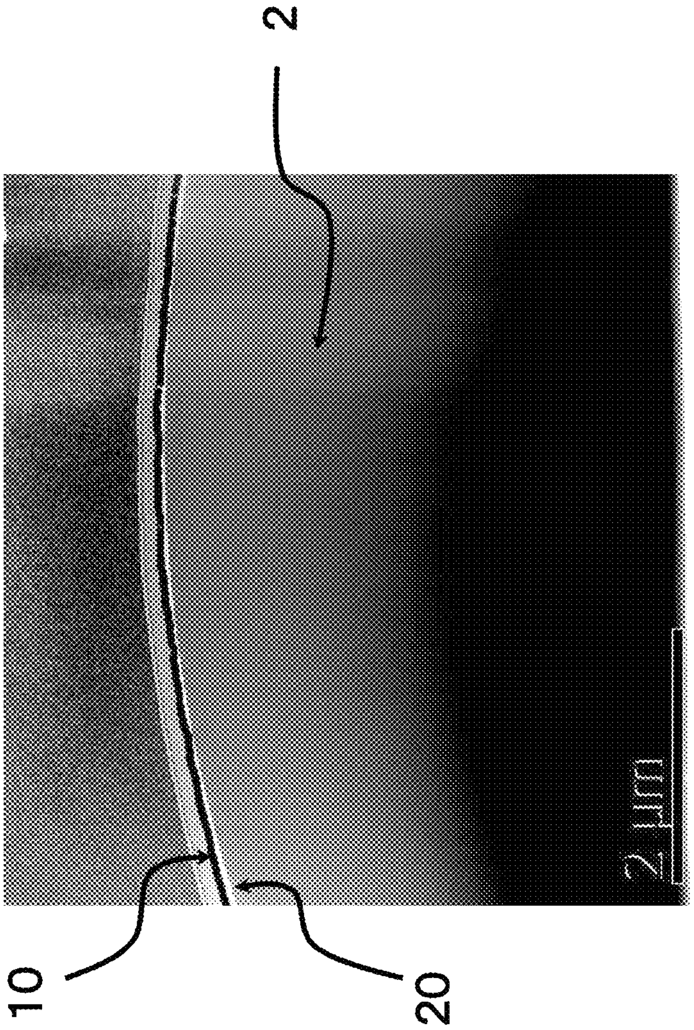

FIG. 5B is an example of an EELS image of the soft magnetic alloy shown in FIG. 4A.

DETAILED DESCRIPTION

Hereinafter, the present disclosure is described in further detail based on embodiments shown in the figures.

A soft magnetic alloy 1 of the present embodiment can be a ribbon form, a powder form, a block form, and the like; and a shape of the soft magnetic alloy 1 is not particularly limited. Also, a size of the soft magnetic alloy 1 is not particularly limited. For example, when the soft magnetic alloy 1 is a ribbon form, a thickness of the ribbon may be within a range of 15 μm to 100 μm. When the soft magnetic alloy 1 is a powder form, an average particle size of the soft magnetic alloy powder can be within a range of 0.5 μm to 150 μm, and preferably within a range of 0.5 μm to 25 μm.

Note that, the above-mentioned average particle size can be measured by using various particle size analyzing method such as a laser diffraction method and the like; and preferably, the average particle size may be measured by using a particle image analyzer Morphologi G3 (made by Malvern Panalytical Ltd). A Morphologi G3 is a device which disperses the soft magnetic alloy powder using air, and a projected area of the individual particle constituting the powder is measured, then a particle size distribution of a circle equivalent diameter from the projected area is obtained. Then, from the obtained particle size distribution, the average particle size is a particle size where a volume-based or number-based cumulative relative frequency is 50%. Note that, when the soft magnetic alloy 1 is included in the magnetic core, the average particle size of the soft magnetic alloy 1 (powder) is obtained by measuring the circle equivalent diameter of the particle included in the cross section by observing the cross section using an electron microscope (SEM, STEM, and the like).

FIG. 1 is a cross section which is an enlarged image near a surface of the soft magnetic alloy 1. As shown in FIG. 1, the soft magnetic alloy 1 includes an internal area 2, a Co concentrated area 11 is positioned closer to the surface side of the soft magnetic alloy 1 than the internal area 2, and a SB concentrated area 12 is positioned closer to the surface side of the soft magnetic alloy 1 than the Co concentrated area 11, and a Fe concentrated area including Fe existing closer to the surface side than the SB concentrated area. Note that, in the present embodiment, "an inner side" means a side closer to a center of the soft magnetic alloy 1, "a surface side" or "an outer side" means a side away from the center of the soft magnetic alloy 1.

Internal Area 2

The internal area 2 is a main part of the soft magnetic alloy 1 which occupies at least 90 vol % of a volume of the soft magnetic alloy 1. Thus, an average composition of the soft magnetic alloy 1 can be considered as a composition of the internal area 2; and a crystal structure of the soft magnetic alloy 1 can be considered as a crystal structure of the internal area 2. Note that, a volume ratio of the above-mentioned internal area 2 is interchangeable with an area ratio, and the internal area 2 occupies at least 90% of a cross section of the soft magnetic alloy 1.

The internal area 2 (that is, the soft magnetic alloy 1) has a soft magnetic type alloy composition including Fe and Co, and a specific alloy composition is not particularly limited. For example, the internal area 2 can be a crystal type soft magnetic alloy of a Fe—Co based alloy, a Fe—Co—V based alloy, a Fe—Co—Si based alloy, a Fe—Co—Si—Al based alloy, and the like. Further, in the internal area 2, P is preferably included, and as a crystal type soft magnetic alloy including P, a Fe—Co—Si—P based alloy, a Fe—Co—Si—P—Cr based alloy, and the like may be mentioned. By including P in the internal area 2, Co tends to easily concentrate at an outer edge of the internal area 2.

Also, from the point of lowering a coercivity, the internal area 2 is preferably constituted by an amorphous alloy composition or a nanocrystal alloy composition. As an amorphous or nanocrystal soft magnetic alloy, a Fe—Co—P—C based alloy, a Fe—Co—B based alloy, a Fe—Co—B—Si based alloy, or the like may be mentioned. More specifically, the internal area 2 is preferably constituted by an alloy composition satisfying a compositional formula of $((Fe_{(1-(\alpha+\beta))}Co_{\alpha}Ni_{\beta})_{1-\gamma}X1_{\gamma})_{(1-(a+b+c+d+e))}B_aP_bSi_cC_dCr_e$. As the internal area 2 is constituted by the alloy composition satisfying the above-compositional formula, a crystal structure made of amorphous, heteroamorphous, or nanocrystals tends to be obtained easily.

In the above-mentioned compositional formula, "B" is boron, "P" is phosphorous, "C" is carbon, and X1 is at least one selected from Ti, Zr, Hf, Nb, Ta, Mo, W, Al, Ga, Ag, Zn, S, Ca, Mg, V, Sn, As, Sb, Bi, N, O, Au, Cu, rare earth elements, and platinum group elements. The rare earth elements include Sc, Y, and lanthanoids; and the platinum group elements include Ru, Rh, Pd, Os, Ir, and Pt. Also, $\alpha$, $\beta$, $\gamma$, a, b, c, d, and e represent atomic ratios, and these atomic ratios preferably satisfy the following relations.

A Co amount ($\alpha$) with respect to Fe may be within a range $0.005\le\alpha\le0.700$, may be within a range of $0.010\le\alpha\le0.600$, may be within a range of $0.030\le\alpha\le0.600$, or may be within a range of $0.050\le\alpha\le0.600$. When the Co amount ($\alpha$) is within the above-mentioned range, a saturation magnetic flux density (Bs) and the corrosion resistance improve. From the point of improving Bs, the Co amount ($\alpha$) may preferably be within a range of $0.050\le\alpha\le0.500$. As the Co amount ($\alpha$) increases, the corrosion resistance tends to improve; and when the Co amount ($\alpha$) is too large, Bs tends to decrease easily.

Also, a Ni amount ($\beta$) with respect to Fe may be within a range of $0\le\beta\le0.200$. That is, Ni may not be included, and the Ni amount ($\beta$) may be within a range of $0.005\le\beta\le0.200$. From the point of improving Bs, the Ni amount ($\beta$) may be within a range of $0\le\beta\le0.050$, may be within a of $0.001\le\beta\le0.050$, or may be within a range of $0.005\le\beta\le0.010$. As the Ni amount ($\beta$) increases, the corrosion resistance tends to improve, and when the Ni amount ($\beta$) is too large, Bs decreases.

X1 may be included as impurities, or may be added intentionally. A X1 amount ($\gamma$) may be within a range of $0\le\gamma\le0.030$. That is, less than 3.0% of a total amount of Fe, Co, and Ni may be substituted by X1.

Further, when a sum of atomic ratios of elements constituting the soft magnetic alloy is 1, an atomic ratio of a total amount of Fe, Co, Ni, and X1 is preferably within a range of $0.720\le(1-(a+b+c+d+e))\le0.950$, and more preferably is within a range of $0.780\le(1-(a+b+c+d+e))\le0.890$. When the above-mentioned relation is satisfied, Bs tends to improve easily. Also, when $0.720\le(1-(a+b+c+d+e))\le0.890$ is satisfied, an amorphous soft magnetic alloy is easily obtained.

The atomic ratio of B is represented by "a", and "a" is preferably within a range of $0\le a\le0.200$; and from the point of improving Bs, "a" is more preferably within a range of $0\le a\le0.150$.

The atomic ratio of P is represented by "b", and "b" is preferably within a range of $0\le b\le0.100$. That is, P may not be included, and from the point of improving both Bs and the corrosion resistance, "b" is preferably within a range of $0.001\le b\le0.100$, more preferably within a range of $0.005\le b\le0.080$, and particularly preferably within a range of $0.005\le b\le0.050$.

The atomic ratio of Si is represented by "c", and "c" is preferably within a range of $0\le c\le0.150$. That is, Si may not be included; and from the point of improving both Bs and the corrosion resistance, "c" is more preferably within a range of $0.001\le c\le0.070$.

The atomic ratio of C is represented by "d", and "d" is preferably within a range of $0\le d\le0.050$. That is, C may not be included; and from the point of improving both Bs and the corrosion resistance, "d" is more preferably within a range of $0\le d\le0.020$.

The atomic ratio of Cr is represented by "e", and "e" is preferably within a range of $0\le e\le0.050$. That is, from the point of improving Bs, Cr may not be included; and from the point of improving both Bs and the corrosion resistance, "e" is more preferably within a range of $0.001\le e\le0.020$.

The composition of the above-mentioned internal area 2 (that is, the composition of the soft magnetic alloy 1) can be analyzed, for example, by using Inductively Coupled Plasma (ICP). Here, when it is difficult to determine an oxygen amount by using ICP, an impulse heat melting extraction method can be used. Also, if it is difficult to determine a carbon amount and a sulfur amount by using ICP, an infrared absorption method can be used.

Also, other than ICP, a compositional analysis may be carried out by EDX (Energy Dispersive X-ray Spectroscopy) or EPMA (Energy Probe Microanalyzer) using an electron microscope. For example, regarding the soft magnetic alloy 1 included in a magnetic core which includes a resin component, a compositional analysis using ICP may be difficult in some cases. In such case, the compositional analysis may be carried out using EDX or EPMA. Also, if a detailed compositional analysis is difficult by any of the above-mentioned methods, the detailed compositional analysis may be performed using 3DAP (three dimensional atom probe). In case of using 3DAP, the influence of the resin component, a surface oxidation, and the like are excluded from the area of analysis, then the composition of the soft magnetic alloy 1, that is the composition of the internal area 2, can be determined. This is because when 3DAP is used, a small area (for example, an area of φ20 nm×100 nm) is set in the soft magnetic alloy 1 to determine an average composition.

Figure 3:
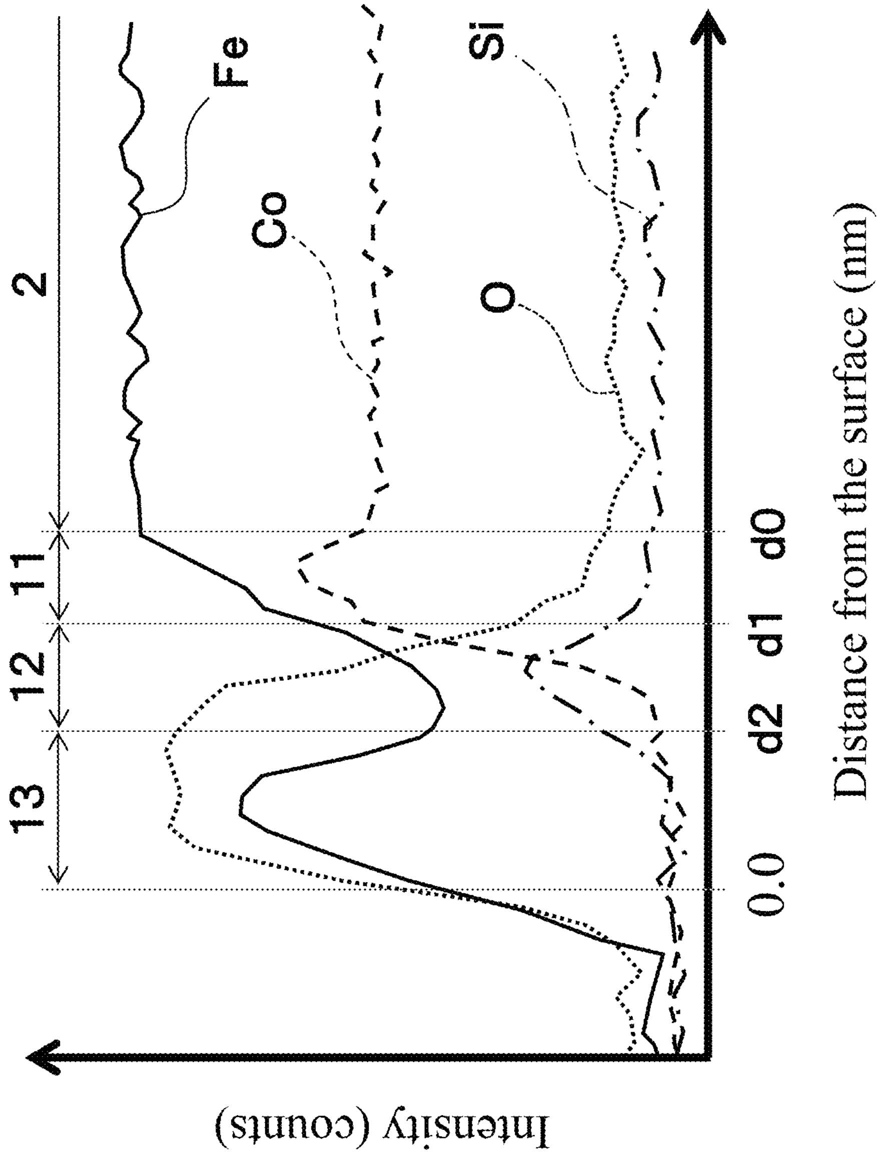
FIG. 3 is an example of a graph obtained by performing a line analysis using EDX along a measurement line $L_M$ shown in FIG. 1.

Note that, in case a line analysis of a cross section near the surface side of the soft magnetic alloy 1 is carried out by using EDX or EELS (Electron Energy Loss Spectroscopy), the internal area 2 can be recognized as an area having stable concentrations of Fe and Co (see FIG. 3). Also, for example, the average composition obtained by performing a mapping analysis to the internal area 2 can be considered as the composition of the soft magnetic alloy 1. In such case, the mapping analysis is performed using EDX or EELS; and an area to be measured is an area which is 100 nm or more away in a depth direction from the surface of the soft magnetic alloy 1 (corresponds to the internal area 2), and an area of measurement may be about 256 nm×256 nm or so.

A crystal structure of the internal area 2 (that is, a crystal structure of the soft magnetic alloy 1) can be a crystalline structure, a nanocrystal structure, or an amorphous structure; and preferably the crystal structure of the internal area 2 may be an amorphous structure. In other words, an amorphous degree X of the internal area 2 (that is, an amorphous degree X of the soft magnetic alloy 1) is preferably 85% or more. The crystal structure having the amorphous degree X of 85% or more is a structure which is mostly made of amorphous, or heteroamorphous. The structure made of heteroamorphous is a structure in which crystals slightly exist inside amorphous. That is, in the present embodiment, "a crystal structure is amorphous" means that a crystal structure has the amorphous degree X of 85% or more; and crystals may be included as long as the amorphous degree X satisfies the above-mentioned range.

Note that, in case the structure is heteroamorphous, the average crystal particle size of the crystals existing in amorphous structure preferably within a range of 0.1 nm or more and 10 nm or less. Also, in the present embodiment, "nanocrystal" refers to a crystal structure in which the amorphous degree X is less than 85% and the average crystal particle size is 100 nm or less (preferably 3 nm to 50 nm). Further, "crystalline" refers to a crystal structure in which the amorphous degree X is less than 85% and the average crystal particle size is larger than 100 nm.

Figure 2A:
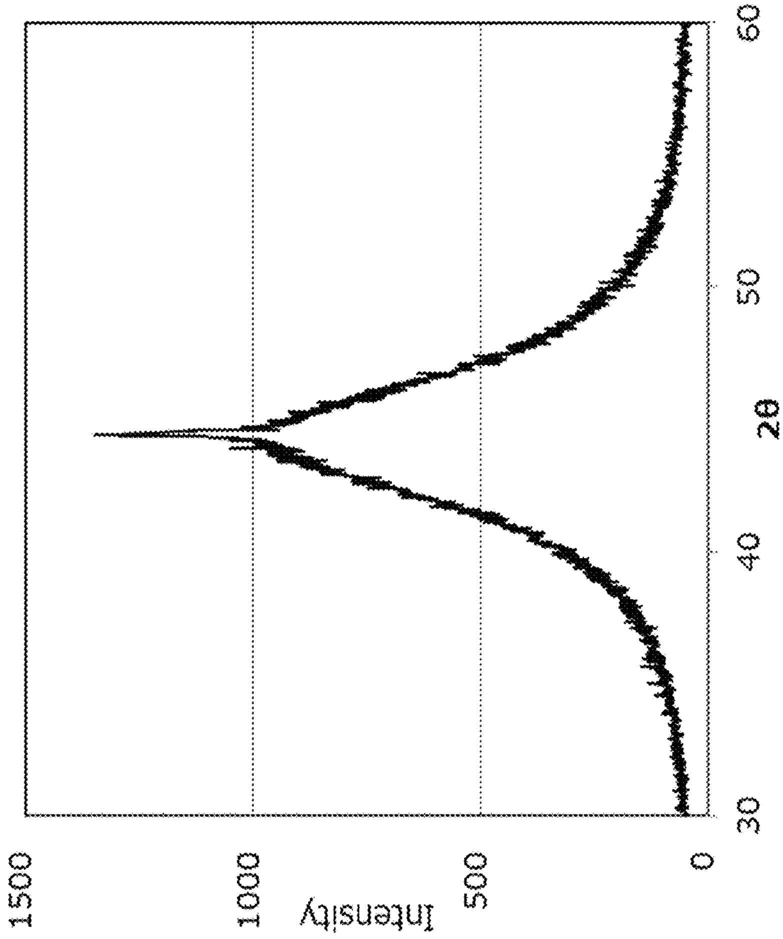
FIG. 2A is an example of a chart obtained from an X-ray crystallography.

The amorphous degree X can be measured by X-ray crystallography using XRD. Specifically, 2θ/θ measurement is performed using XRD to the soft magnetic alloy 1 according to the present embodiment, and a chart shown in FIG. 2A is obtained. Here, a measurement range of a diffraction angle 2θ is preferably set to a range in which amorphous-derived halos can be confirmed, for example within a range of 2θ=30° to 60°.

Figure 2B:
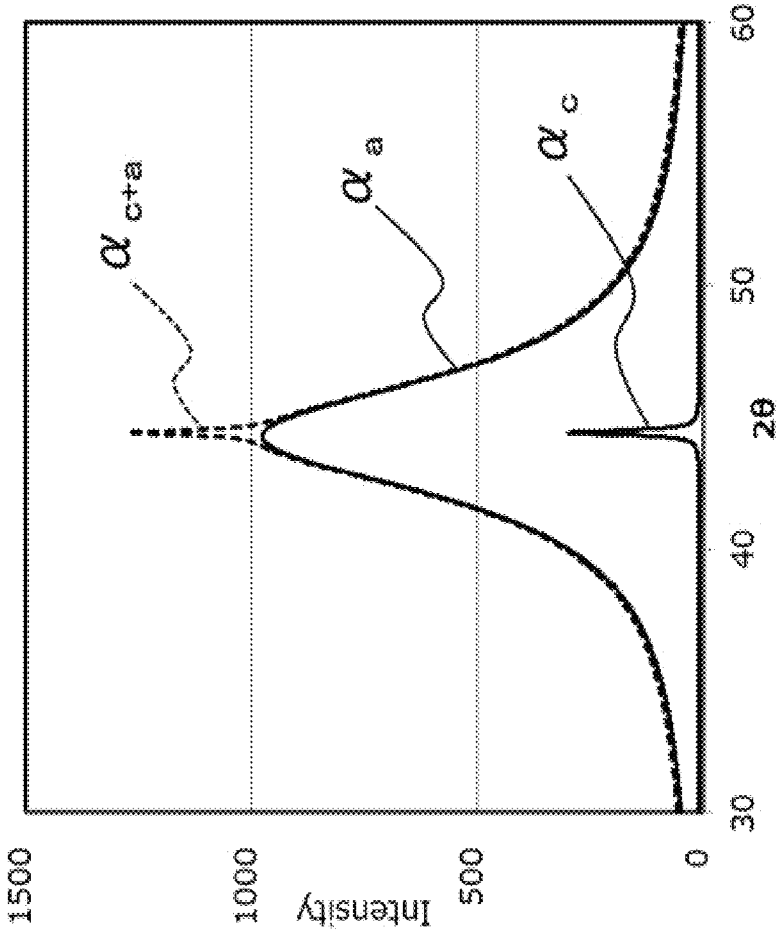
FIG. 2B is an example of a pattern obtained by profile fitting the chart shown in FIG. 2A.

Next, the chart shown in FIG. 2A is profile-fitted using a Lorentz function represented by the following equation (2). In this profile fitting, a difference between the integrated intensities actually measured by using XRD and the integrated intensities calculated using the Lorentz function is preferably within 1%. As a result of this profile fitting, as shown in FIG. 2B, a crystal component pattern $\alpha_c$ which indicates a crystal scattering integrated intensity Ic, an amorphous component pattern $\alpha_a$ which indicates an amorphous scattering integrated intensity Ia, and a pattern $\alpha_{c+a}$ which is a combination of these two are obtained. Then, the crystal scattering integrated intensity Ic and the amorphous scattering integrated intensity Ia are placed in the below equation (1), thereby the amorphous degree X is obtained.

$$X=100-(Ic/(Ic-Ia)\times 100) \quad \text{Equation (1)}$$

Ic: Crystal scattering integrated intensity
Ia: Amorphous scattering integrated intensity

[Formula 1]

$$f(x)=\frac{h}{1+\frac{(x-u)^2}{w^2}}+b \quad \text{(Equation 2)}$$

h: Peak height
u: Peak position
w: Half bandwidth
b: Background height

Note that, a method of measuring the amorphous degree X is not limited to a method using the above-mentioned XRD, and the amorphous degree X may be measured by using EBSD (Electron BackScatter Diffraction) or electron diffraction.

(Co Concentrated Area 11)

The Co concentrated area 11 is an area having a higher concentration of Co than in the internal area 2. In the present embodiment, this Co concentrated area 11 is preferably an amorphous metal phase continuous from the internal area 2, and covers at least part of periphery of the internal area 2. A coverage of the Co concentrated area 11 with respect to the internal area 2 in the cross section of the soft magnetic alloy 1 is not particularly limited, and for example the coverage can be 50% or more, or more preferably it is 80% or more.

The cross section of the surface area of the soft magnetic alloy 1 is observed using STEM (scanning transmission electron microscope) or TEM (transmission electron microscope), and at the same time a mapping analysis is performed using EDX or EELS, thereby the presence of the Co concentrated area 11 and the coverage thereof can be verified. For example, the image (EELS image) shown in FIG. 5A is an example of the mapping analysis result using EELS. Three EELS images shown in FIG. 5A each shows a result measured at the same place. The EELS image on the left side (Co-L) shows the Co distribution, the image in the middle (B-K) shows the B distribution, and the image on the right side (Fe-L) shows the Fe distribution. In said EELS images, the internal area 2 can be recognized as an area where almost no shade of Fe and Co can be seen in Co concentration distribution and in Fe concentration distribution. Further, at the edge of the internal area 2, the contrast indicating Co becomes brighter (see EELS image of Co-L), and this implicates that the Co concentration is higher than in the internal area 2. This area with a high Co concentration is the Co concentrated area 11, and the presence of the Co concentrated area 11 can be confirmed by the EELS image of Co.

An average thickness t1 of the Co concentrated area 11 identified by this mapping analysis is preferably 0.3 nm or more. The upper limit of t1 is not particularly limited, and for example it can be 30.0 nm or less. When t1 is thickened within this preferable range, further enhanced corrosion resistance can be obtained. Note that, the average thickness t1 is preferably calculated by measuring the thickness of the Co concentrated area 11 of at least from 3 different points by changing the area of measurement.

As mentioned in above, the Co concentrated area 11 may be extremely thin in some cases, thus in case of identifying the Co concentrated area 11, a line analysis is preferably used together with the mapping analysis. FIG. 3 is a schematic diagram showing an example of a line analysis result along a measurement line $L_M$ shown in FIG. 1A; and a vertical axis is a detection intensity of each element (that is, the intensity of characteristic X-ray), and a horizontal axis is a distance (depth) from the outer most surface 10. As shown in FIG. 3, the line analysis results show a high peak of Co concentration at the edge of the internal area 2 in which the concentrations of Fe and Co are stable. The area showing this peak of Co is the Co concentrated area 11. In other words, a local maximum of the Co concentration exists in the Co concentrated area 11, and due to the above-mentioned peak, the presence of the Co concentrated area 11 can be confirmed.

Also, the Co concentrated area 11 having said peak preferably is a metal phase. A phase state of the Co concentrated area 11 can be verified for example by a line analysis, a mapping analysis, or analysis using EELS (Electron Energy Loss Spectroscopy) of STEM or TEM. Specifically, when the Co concentrated area 11 is a metal phase, a line analysis or a mapping analysis shows a lower oxygen concentration in the Co concentrated area 11 than an oxygen concentration in the SB concentrated area 12 (see FIG. 3). Also, when spectrums obtained by EELS are analyzed, ratios of oxides of Co and metal Co in the Co concentrated area 11 can be calculated. When a ratio of metal Co is larger than a ratio of oxides of Co, the Co concentrated area 11 is defined as a metal phase. Note that, in TEM image obtained by observation of the transmitted waves, the contrast of the Co concentrated area 11 is darker than the SB concentrated area 12 which is an oxide phase, hence this also enables to confirm that the Co concentrated area 11 is a metal phase.

Also, in the present embodiment, the Co concentration degree in the Co concentrated area 11 is defined by a ratio ($C11_{Co}/C2_{Co}$) of a Co mole ratio in the Co concentrated area 11 ($C11_{Co}$) with respect to a Co mole ratio in the internal area 2 ($C2_{Co}$). The Co concentration degree is preferably larger than 1.02, and more preferably larger than 1.20. Note that, the upper limit of the Co concentration degree is not particularly limited, and for example it can be 20 or less.

When a soft magnetic alloy which is made of the internal area 2 without forming the Co concentrated area 11 is used as a standard alloy, the corrosion resistance of the soft magnetic alloy 1 of the present embodiment compared to the standard alloy tends to improve as the Co concentration degree increases. That is, the Co concentration degree and the corrosion resistance show a positive correlation. Note that, as the internal area 2 of the soft magnetic alloy 1 includes a predetermined amount of P, the Co concentration degree tends to increase easily, and the corrosion resistance tends to further improve.

$C2_{Co}$ and $C11_{Co}$ used for the calculation of the Co concentration degree are measured by carrying out a component analysis using EELS. Specifically, $C2_{Co}$ is a mole ratio of Co with respect to a total of Fe and Co detected in the internal area 2, and $C2_{Co}$ is calculated by analyzing the EELS spectrums. Similarly, $C11_{Co}$ is a mole ratio of Co with respect to a total of Fe and Co detected in the Co concentrated area 11. That is, the mole ratio of Co in each area is represented by "Co/(Fe+Co)". In order to remove the influence from the impurities (elements which are mixed while making the measurement sample), (Fe+Co) is used as a denominator. Note that, a resolution during said analysis is preferably set to 0.5 nm or less, and for measuring $C2_{Co}$, preferably a point which is a depth of 0.2 μm or deeper from the outer most surface 10 of the soft magnetic alloy 1 towards the inside is measured. Also, the above-mentioned measurement is performed to at least five observation fields, and the Co concentration degree is obtained as the average of the measurement results.

Note that, in the Co concentrated area 11, Co is detected as a main constitution element, and other than this, elements which constitute the internal area 2 such as Fe and the like are also included in the Co concentrated area 11. Further, in the Co concentrated area 11, as similar to the concentration of Co, other elements may be concentrated as well; and as one of such other elements, P may be mentioned. In this case, in a mapping analysis and a line analysis, a highly concentrated area of P may be observed in a way which overlaps with a highly concentrated area of Co.

(SB Concentrated Area 12)

The SB concentrated area 12 is an area having a higher concentration of at least one selected from Si and B than in the internal area 2. In the SB concentrated area 12, either one of Si or B may be concentrated, or both Si and B may be concentrated. In the present embodiment, this SB concentrated area 12 covers at least part of the periphery of the Co concentrated area 11. Also, at a part where the Co concentrated area 11 does not exist, the SB concentrated area 12 may directly contact the internal area 2 and covers the internal area 2. A coverage of the SB concentrated area 12 of the soft magnetic alloy 1 is not particularly limited, and for example it can be 50% or more, and preferably it can be 80% or more.

As similar to the Co concentrated area 11, the presence of the SB concentrated area 12 can be verified by performing a mapping analysis using EDX or EELS. For example, in the middle EELS image (B-K) of FIG. 5A, a shade of B is shown by a brightness contrast, and the B concentration is confirmed to be higher at the surface side of the Co concentrated area 11 than in the internal area 2. In case of FIG. 5A, this area with a high concentration of B is the SB concentrated area 12.

An average thickness t2 of the SB concentrated area 12 identified by this mapping analysis is preferably 0.5 nm or more. The upper limit of t2 is not particularly limited, and for example it can be 30 nm or less. Note that, as similar to t1, preferably, the thickness of the SB concentrated area 12 is measured at least from 3 different points by changing the areas of measurement, and the average thereof is calculated to determine the average thickness t2.

Also, the SB concentrated area 12 is preferably identified by using both a mapping analysis and a line analysis. As shown in FIG. 3, according to a line analysis result, Si or/and B concentration peak (peak including the local maximum of Si or/and B) can be confirmed at a position closer to the surface side than the peak of Co; and the position where the peak of Si or/and B is found is the SB concentrated area 12. Further specifically, the SB concentrated area 12 can be determined by a characteristic X-ray intensity derived from Si and B when a line analysis is carried out. That is, when the intensity of the SB concentrated area 12 is stronger than the intensity derived from Si and B of the internal area 2, then it can be concluded that Si or/and B is concentrated. Note that, as mentioned in above, the amount of element can be mapped from the intensity of each element by carrying out a mapping analysis, hence the SB concentrated area 12 can be identified based on the obtained mapping image.

Regarding the SB concentrated area 12, the concentration degrees of Si and B are represented by an intensity ratio, and this intensity ratio is calculated from a line analysis using EDX or EELS. Specifically, a detection intensity of Si in the SB concentrated area 12 is defined as $C12_s$, a detection intensity of Si in the internal area 2 is defined as $C2_s$, and a Si intensity ratio (concentration degree) in the SB concentrated area is defined as $C12_s/C2_s$. This Si intensity ratio is preferably measured using EDX from the point of a resolution, and when Si is concentrated in the SB concentrated area 12, then the Si intensity ratio is larger than 1.0. In the present embodiment, preferably the Si intensity ratio is 1.1 or more, and more preferably it is 1.2 or more. Also, the upper limit of the Si intensity ratio is not particularly limited, and for example it can be 20 or less.

Similarly, a detection intensity of B in the SB concentrated area 12 is defined as $C12_B$, a detection intensity of B in the internal area 2 is defined as $C2_B$, and a B intensity ratio (concentration degree) in the SB concentrated area 12 is defined as $C12_B/C2_B$. This B intensity ratio is preferably measured using EELS from the point of a resolution, and when B is concentrated in the SB concentrated area 12, then the B intensity ratio is larger than 1.0. In the present embodiment, preferably the B intensity ratio is 1.1 or more, and more preferably 1.2 or more. Also, the upper limit of the B intensity ratio is not particularly limited, and for example it can be 20 or less.

The SB concentrated area 12 is preferably an oxide phase. When the SB concentrated area 12 is an oxide phase, it can be confirmed that an area with a high concentration of oxygen overlaps with the Si or/and B highly concentrated area, by the above-mapping analysis. Also, in a line analysis result, the oxygen concentration is higher at the position where Si or/and B peak is found than in the internal area 2 and than in the Co concentrated area 11. For example, FIG. 3 is an image showing that the peak of the Si concentration and the peak of the oxygen concentration partially overlap in the SB concentrated area 12. Note that, when the SB concentrated area 12 is an oxide phase, in the TEM image, the SB concentrated area 12 can be recognized as an area having a brighter contrast than the internal area 2. Also, regarding the SB concentrated area 12, as similar to the Co concentrated area 11, a phase state can be confirmed by analyzing the spectrums obtained from EELS.

Also, the SB concentrated area 12 is preferably amorphous. Here, a crystallinity of the SB concentrated area 12 is determined by the presence of a spot caused by a crystal in FFT (Fast Fourier Transformation) pattern. That is, if a spot is not found in FFT pattern of the SB concentrated area 12, the SB concentrated area 12 is considered amorphous, and if a spot is found, then it is considered that the SB concentrated area is crystalline. This FFT pattern is obtained by observing the cross section including the SB concentrated area 12 using HRTEM (High Resolution Transmission Electron Microscope), then performing a Fast Fourier Transformation process to the obtained HRTEM image. Note that, a selected area method in a micro area or a nanodiffraction method may be used for analyzing the crystal structure of the SB concentrated area 12.

Note that, even in case that the crystallinity of the SB concentrated area 12 identified by the above method is amorphous, crystals may partially exist in the SB concentrated area 12. That is, even when the SB concentrated area 12 is amorphous, crystals may be included as long as a spot derived from crystal is not found in FFT pattern.

More specifically, a crystallized area ratio in the cross section of the SB concentrated area (represented by $S_{SB}^{cry}/S_{SB}$) is preferably within a range of 0 to 0.5. This crystallized area ratio can be measured by image analyzing the HRTEM image. In the HRTEM image, due to a phase contrast, a regularly arranged lattice can be confirmed in a crystalline part, and a random pattern can be confirmed in an amorphous part. Thus, by analyzing the HRTEM image, an area $S_{SB}$ of the SB concentrated area 12 and an area $S_{SB}^{cry}$ which is a region where a regularly arranged lattice is confirmed (that is a crystal part) are measured; then the crystallized area ratio, which is a ratio of $S_{SB}^{cry}$ to $S_{SB}$, is calculated.

Note that, in the SB concentrated area 12, as mentioned in above, Si, B, and O are detected; and other than these, the constitution elements of the internal area 2 such as Fe, Co, and the like can be detected.

(Fe Concentrated Area 13)

The Fe concentrated area 13 is an oxide phase at least including Fe, and covers at least part of a periphery of the SB concentrated area 12. Also, at a region where the SB concentrated area 12 partially does not exist, the Fe concentrated area 13 may be directly contact with the Co concentrated area 11 or the internal area 2. A coverage of the Fe concentrated area 13 of the soft magnetic alloy 1 can be 50% or more, and more preferably 80% or more.

A Fe concentration $C13_{Fe}$ in the Fe concentrated area 13 is preferably higher than a Fe concentration in other concentrated areas (11, 12). For example, a Fe concentration degree $C13_{Fe}/C2_{Fe}$ in the Fe concentrated area 13 can be within a range of $1<(C13_{Fe}/C2_{Fe})\leq 2.0$. Note that, the Fe concentration in the above-mentioned each area (2, 11 to 13) can be measured using EELS and the like, and as similar to the Co concentration degree, the Fe concentration degree may be calculated as a mole ratio of Fe with respect to a total of Fe and Co (that is Fe/(Fe+Co)) detected at the measurement point. Also, as similar to the case of Co concentration degree and the SB concentration degree, the Fe concentration degree is preferably obtained by performing a component analysis using EELS and the like to at least five observation fields, and the Fe concentration degree is preferably calculated as the average of the measurement results.

Regarding the Fe concentrated area 13, as similar to other concentrated areas (11, 12), the Fe concentrated area 13 can be confirmed by performing a mapping analysis using EDX or EELS. For example, regarding the EELS image on the left side of FIG. 5A, the Fe detection intensity is decreased in the SB concentrated area 12 has a high detection intensity of Si or/and B than in the internal area 2. Further, when the Fe concentrated area 13 exists, the area having a high Fe detection intensity exists so that the area with a low Fe intensity is covered, and it can be confirmed that Fe is concentrated at the outside of the SB concentrated area 12. Thereby, the Fe concentrated area 13 can be identified by a mapping analysis.

An average thickness t3 of the Fe concentrated area 13 identified by the above-mentioned method is preferably 1 nm or more. The upper limit of t3 is not particularly limited, and for example it can be 50 nm or less. As similar to t1 and t2, the average thickness t3 of the Fe concentrated area 13 is preferably calculated by measuring at least from 3 different points of the thickness of the Fe concentrated area 13 by changing the area of measurement.

Note that, the presence of the Fe concentrated area 13 can be confirmed not only by a mapping analysis but also by a line analysis. According to the result of a line analysis as shown in FIG. 3, a peak of the Fe detection intensity is higher in the Fe concentrated area 13 than in the SB concentrated area 12. This peak of Fe enables to confirm that Fe is concentrated at the outside of the SB concentrated area 12. Also, as mentioned in above, the Fe concentrated area 13 is an oxide phase, hence when the Fe concentrated area 13 is analyzed using a mapping analysis or a line analysis, an oxygen concentration is higher in the Fe concentrated area 13 than in the internal area 2. Further, when spectrums obtained by EELS are analyzed, a ratio of oxides of Fe and metal Fe in the Fe concentrated area 13 can be calculated, and in case that the ratio of oxides of Fe is larger than the ratio of metal Fe, then the Fe concentrated area 13 is determined as an oxide phase. As such, a phase state of the Fe concentrated area 13 can be analyzed by a line analysis, a mapping analysis, or a spectrum analysis using EELS.

The crystal structure of the Fe concentrated area 13 is a structure including crystalline, and in FFT pattern of the Fe concentrated area 13, a spot derived from a crystal can be confirmed. Also, as similar to the SB concentrated area 12, when the crystallized area ratio $S_{Fe}^{cry}/S_{Fe}$ in the cross section of the Fe concentrated area 13 is measured by image analyzing the HRTEM image, $S_{Fe}^{cry}/S_{Fe}$ is higher than $S_{SB}^{cry}/S_{SB}$ of the SB concentrated area 12, hence satisfies the relation of $(S_{SB}^{cry}/S_{SB})<(S_{Fe}^{cry}/S_{Fe})$ is satisfied. In other words, the difference between the crystallized area ratio of the Fe concentrated area 13 and the crystallized area ratio of the SB concentrated area which is expressed by "$DCA=(S_{Fe}^{cry}/S_{Fe})-(S_{SB}^{cry}/S_{SB})$" satisfies the relation of $0<DCA$. By forming the Fe concentrated area 13 constituted by such crystal structure at the out side of the SB concentrated area 12, the corrosion resistance of the soft magnetic alloy 1 improves.

A specific range of the crystallized area ratio $S_{Fe}^{cry}/S_{Fe}$ is not particularly limited, and for example a difference between the crystallized area ratio $S_{Fe}^{cry}/S_{Fe}$ and the crystallized area ratio $S_{SB}^{cry}/S_{SB}$ shown by "$(S_{Fe}^{cry}/S_{Fe})-(S_{SB}^{cry}/S_{SB})$" is preferably 0.01 or more, and more preferably 0.05 or more. Note that, other than the analysis method using the above-mentioned HRTEM, a selected area method in a micro area or a nanodiffraction method may be used for analyzing the crystal structure of the Fe concentrated area 13.

In the Fe concentrated area 13 satisfying such characteristics, at least Fe and O are detected, and other than these, the constituting elements of the internal area 2 such as Co, Si, B, P, and the like may be detected in some cases. Note that, the Co concentration in the Fe concentrated area 13 is lower than the Co concentration in the internal area 2 and the Co concentrated area 11, and a total concentration of Si and B in the Fe concentrated area 13 is lower than in the internal area 2 and the SB concentrated area 12.

As mentioned in above, the soft magnetic alloy 1 has a characteristic surface structure which includes the Co concentrated area 11, the SB concentrated area 12, and the Fe concentrated area 13. Particularly, in the present embodiment, as shown in FIG. 1, the Fe concentrated area 13 is positioned at the outer most surface side and constitutes an outer most surface 10 of the soft magnetic alloy 1. Note that, as the soft magnetic alloy 1*b* shown in FIG. 4A and FIG. 4B, a coating layer 20 for insulation may be formed at the outside of the Fe concentrated area 13.

In this case, the outer most surface 10 of the soft magnetic alloy 1*b* is constituted by the coating layer 20. FIG. 5B is in fact an example of a STEM image of the soft magnetic alloy 1*b* shown in FIG. 4A. In this STEM image, an area with brighter contrast can be verified at the outer most surface of the soft magnetic alloy 1*b*, and this area is the coating layer 20. This coating layer 20 is a coating layer which is formed by carrying out a surface treatment such as coating or so after other concentrated areas (11 to 13) are formed. An average thickness of the coating layer 20 is preferably within a range of 5 nm or more and 100 nm or less, and more preferably it is 50 nm or less. Note that, as shown in FIG. 4A, in many cases, such coating layer 20 is formed to the soft magnetic alloy of a powder form, but the coating layer 20 may be formed to the soft magnetic alloy of a ribbon form.

As discussed in above, the surface structure of the soft magnetic alloy 1 can include the coating layer 20, and even in case of including the coating layer 20, the Co concentrated area 11 exist at the side which is in contact with the internal area 2. Further, a perpendicular distance d1 from the outer most surface 10 to the Co concentrated area 11 is preferably 200 nm or less, more preferably 100 nm or less, and even more preferably 50 nm or less. Particularly in case that the coating layer 20 does not exist and the outer most surface 10 is constituted by the Fe concentrated area 13, the perpendicular distance d1 is preferably 30 nm or less, and more preferably 20 nm or less.

Note that, a measurement sample for analyzing each concentrated area (11 to 13) is preferably produced by using a micro-sampling method which uses FIB (Focused Ion Beam). For example, a Pt film of a thickness of 30 nm or so is formed by spattering to the outer most surface 10 of the soft magnetic alloy 1 to protect the surface while processing, then using FIB, an area at a depth of about 2 μm from the outer most surface is cut out, thereby a thin sample is obtained. Then, this thin sample is processed and thinned so that a thickness in a direction perpendicular to the depth direction is 20 nm or less. This sample formed into a thin film may be used as a measurement sample for TEM and HRTEM observation.

Hereinbelow, a method of producing the soft magnetic alloy 1 according to the present embodiment is described.

The main part (internal area 2) of the soft magnetic alloy 1 can be produced by various melting methods, and preferably it may be made by using a method in which a molten is quenched. This is because the amorphous soft magnetic alloy 1 can be easily obtained by quenching. For example, the soft magnetic alloy 1 of a ribbon form can be produced by a single roll method, and the soft magnetic alloy 1 of a powder form can be produced by an atomization method. Hereinbelow, a method of obtaining a soft magnetic alloy ribbon formed by a single roll method, and a method of obtaining a soft magnetic alloy powder formed by a gas atomization method are described.

In a single roll method, raw materials (pure metal and the like) of elements constituting the soft magnetic alloy 1 are prepared and weighed so to satisfy the target alloy composition. Then, the raw materials of the elements are melted to produce a mother alloy. A method of melting for producing the mother alloy is not particularly limited, and for example a method of melting by using high frequency heating in a chamber at a predetermined degree of vacuum may be mentioned.

Next, the above-mentioned mother alloy is heated and melted to obtain a molten. A temperature of the molten may be determined by taking the melting point of the target alloy composition into consideration. For example, the temperature of the molten may be within a range of 1200° C. to 1600° C. In a single roll method, this molten is supplied using a nozzle and the like to a cooled rotating roller, thereby a soft magnetic alloy ribbon is produced along the rotating direction of the roll. A thickness of the ribbon can be regulated by adjusting a rotation speed of the roll, a distance between the nozzle and the roll, a temperature of the molten, and the like. Also, the temperature and the rotation speed of the roll may be set to a condition so that the amorphous soft magnetic alloy can be easily obtained. For example, preferably, the temperature of the roll is within a range of 20° C. to 30° C., and a rotation speed is preferably within a range of 20 to 30 m/sec. Note that, an atmosphere inside the chamber is not particularly limited, and for example it can be air atmosphere or an inert atmosphere.

In a gas atomization method, as similar to the above-mentioned single roll method, a molten within a range of 1200° C. to 1600° C. is obtained, then the molten is sprayed in the chamber to produce a powder. Specifically, the molten is exhausted from an exhaust port towards a cooling part, and a high-pressured gas is sprayed to exhausted molten metal drops. By spraying the high-pressured gas to the molten metal drops, the molten metal drops scatter at the inside of the chamber, and as these collide against the cooling part (cooling water), the molten metal drops cool solidify and form the soft magnetic alloy powder. The particle shape of the soft magnetic alloy powder obtained by this atomization method is usually a spherical shape, and an average circularity of the soft magnetic alloy powder is preferably 0.8 or more, more preferably 0.9 or more, and even more preferably 0.95 or more.

As the high-pressured gas, an inert gas such as nitrogen gas, argon gas, helium gas, and the like; or a reducing gas such as ammonium decomposition gas and the like is preferably used. A spraying pressure of the high-pressured gas is preferably within a range of 2.0 MPa or more and 10 MPa or less. Also, a spraying amount of the exhausted molten is preferably within a range of 0.5 kg/min or more and 4.0 kg/min or less. In said gas atomization method, the particle size and the shape of the soft magnetic alloy powder can be adjusted by regulating a ratio of a pressure of the high-pressured gas with respect to the spraying amount of the molten.

After obtaining the soft magnetic alloy of a ribbon form or a powder form as discussed in above, this soft magnetic alloy is heat treated at a low temperature in a predetermined oxygen concentration atmosphere under a predetermined pressure, thereby concentrated areas (11 to 13) are formed.

Specifically, a holding temperature during the heat treatment is preferably a temperature which does not crystallize the soft magnetic alloy, and for example it is preferably within a range of 300° C. to 400° C. Also, a temperature holding time is preferably within a range of 0.25 hours to 3.0 hours, and more preferably within a range of 1 hour to 1.5 hours. An oxygen concentration inside a heating furnace is preferably within a range of 100 ppm or more and 2000 ppm or less, and more preferably within a range of 300 ppm or more and 1000 ppm or less. Further, while controlling the oxygen concentration inside the heating furnace as mentioned in above, an inert gas such as argon gas, nitrogen gas, or the like is introduced into the heating furnace so that the inside of the heating furnace has a positive pressure. A gauge pressure inside the heating furnace is preferably within a range of 0.15 kPa or more and 0.50 kPa or less, and more preferably within a range of 0.15 kPa or more and 0.45 kPa or less. Note that, a gauge pressure refers to a pressure of which atmospheric pressure is subtracted from an absolute pressure (a pressure when an absolute vacuum is 0 Pa).

By heat treating under such condition, the Co concentrated area 11, the SB concentrated area 12, and the Fe concentrated area 13 each having predetermined characteristics are formed to the surface side of the soft magnetic alloy. Note that, when the soft magnetic alloy 1 is crystalline or nanocrystal (that is, when the amorphous degree X is less than 85%), a pre-heat treatment in order to control the crystallinity may be performed prior to the heat treatment for forming the above-mentioned concentrated areas.

In case of forming the coating layer 20 as shown in FIG. 4A and FIG. 4B, a coating treatment such as a phosphate coating treatment, a mechanical alloying treatment, a silane coupling treatment, a hydrothermal synthesis, and the like may be performed, after the concentrated areas (11 to 13) are formed by the above-mentioned heat treatment. As a type of coating layer 20 to be formed, phosphates, silicates, soda-lime glass, borosilicate glass, lead glass, aluminosilicate glass, borate glass, sulfate glass, and the like may be mentioned. Note that, as phophates, for example, magnesium phosphate, calcium phosphate, zinc phosphate, manganese phosphate, cadmium phosphate, and the like may be mentioned. As silicates, sodium silicate and the like may be mentioned. When the coating layer 20 is formed, improvements of the voltage resistance and the like can be expected in the magnetic core including the soft magnetic alloy 1.

The soft magnetic alloy 1 including the concentrated areas (11 to 13) is obtained by going through the above-mentioned steps. The soft magnetic alloy 1 of the present embodiment can be applied to various magnetic components, for example, a coil component such as an inductor, a filter, an antenna, and the like may be mentioned. Particularly, the soft magnetic alloy 1 according to the present embodiment is preferably applied to a magnetic core in a coil component such as an inductor. Note that, the soft magnetic alloy 1 may be constituted by mixing particle groups with different alloy compositions and particle sizes, and other magnetic materials which do not include concentrated areas 11 and 12 may be used together. For example, in the magnetic core including the soft magnetic alloy 1, the magnetic materials not including the concentrated areas 11 and 12 may be included, and also other resin components may also be included.

Summarizing the Present Embodiment

In the soft magnetic alloy 1 of the present embodiment, the Co concentrated area 11, the SB concentrated area 12, and the Fe concentrated area 13 each satisfying predetermined characteristics are formed to the outer side of the internal area 2 having a soft magnetic type alloy composition which includes Fe and Co. Furthermore, the SB concentrated area 12 and the Fe concentrated area 13 satisfy the predetermined relation of $(S_{SB}^{cry}/S_{SB})<(S_{Fe}^{cry}/S_{Fe})$. By having such characteristics, rust formation is suppressed when the soft magnetic alloy 1 is immersed in water, and the corrosion resistance can be improved. Particularly, when the Co concentrated area 11 has the Co concentration degree of larger than 1.20, the corrosion resistance of the soft magnetic alloy 1 can be further improved.

Also, by forming the concentrated areas (11 to 13) to the amorphous soft magnetic alloy 1 having the amorphous degree of 85% or more, the corrosion resistance of the soft magnetic alloy 1 can be further improved while ensuring a high saturation magnetic flux density Bs.

Hereinabove, the embodiment of the present disclosure is described, however, the present disclosure is not limited to the above-mentioned embodiment, and it may be variously modified within the scope of the present disclosure.

EXAMPLES

Hereinbelow, the present disclosure is described in further detail based on specific examples. Note that, the present disclosure is not limited to the examples. In tables shown in below, "*" mark indicates a sample of comparative example.

Experiment 1

In Experiment 1, a soft magnetic alloy powder was produced by using a gas atomization method. In a gas atomization method, the soft magnetic alloy powder of which a volume-based average particle size (D50) was within a range of 15 to 30 μm was obtained under the conditions of a spraying temperature of a molten: 1500° C., a spraying amount of the molten: 1.2 kg/min, a pressure of a high-pressured gas: 7.0 MPa, and a water pressure of a cooling water: 10 MPa. Then, the soft magnetic alloy powder was heat treated under the conditions shown in Table 1, and soft magnetic alloys of Sample No. 2 to 16 were obtained. Also, in Experiment 1, a soft magnetic alloy of Sample No. 1 which was not heat treated was also produced. Using this Sample No. 1 as a standard, evaluations shown in below were carried out.

<Crystal Structure and Composition of the Soft Magnetic Alloy Powder>

The composition of the soft magnetic alloy powder obtained by using a gas atomization method was measured using ICP. As a result, in all samples of Experiment 1, the soft magnetic alloy powder (that is the internal area 2) of each sample was confirmed to have an alloy composition satisfying a compositional formula: $(Fe_{0.7}Co_{0.3})_{0.84}B_{0.11}Si_{0.03}C_{0.01}Cr_{0.01}$ (atomic ratio; α=0.300, β=0, γ=0, a=0.110, b=0, c=0.030, d=0.010, and e=0.010). Also, when the soft magnetic alloy powders of Experiment 1 were performed with X-ray crystallography using XRD, each sample of Experiment 1 showed that the soft magnetic alloy powder (that is the internal area 2) was amorphous satisfying 85% or more of an amorphous degree.

<Analysis of Surface Structure>

From the soft magnetic alloy of each sample of Experiment 1, a thin sample near the surface was taken by a micro sampling method using FIB. Further, using the thin sample, a mapping analysis was carried out using TEM-EDX to examine the presence of the concentrated areas (11 to 13). Further, a component analysis of a specific area was carried out using TEM-EELS, and a Co concentration degree of the Co concentrated area 11 was measured. Further, by carrying an image analysis of HRTEM image, the crystallized area ratio in the SB concentrated area 12 and in the Fe concentrated area 13 were measured, thereby a difference between the crystallized area ratios $DCA=(S_{Fe}^{cry}/S_{Fe})-(S_{sa}^{cry}/S_{SB})$ was calculated. Analysis results of each sample of Experiment 1 are shown in Table 1.

Note that, in Experiment 1, regarding the samples in which the Co concentrated area 11 was found, the Co concentrated area 11 was confirmed to be constituted by an amorphous metal phase. Also, regarding the samples which satisfied 0<DCA, the SB concentrated area 12 and the Fe concentrated area 13 were each confirmed to be constituted by an oxide phase. Furthermore, regarding the samples which satisfied 0<DCA, a spot derived from crystal in FFT pattern of the SB concentrated area 12 was not found, and a spot derived from crystal in FFT pattern of the Fe concentrated area 13 was found.

<Saturation Magnetic Flux Density Bs>

The saturation magnetic flux density Bs of each sample was measured using a vibrating sample magnetometer (VSM) under the condition of 1000 kA/m magnetic flied. Results are shown in Table 1. When this Bs was 1.50 T or more it was considered good, and 1.70 T or more was considered even better.

<Immersion Test>

First, before performing the immersion test, a magnetic core sample was produced using the soft magnetic alloy of each sample. The magnetic core sample was produced by going through below described steps. Granules were obtained by mixing 3 parts by mass of an epoxy resin to 100 parts by mass of the soft magnetic alloy. Then, the granules were filled into a mold, and then pressure molded at a pressure of 4 ton/cm$^2$, thereby a magnetic core sample of a toroidal shape having a size of an outer diameter of 11 mmφ, an inner diameter of 6.5 mmφ, and a height of 1.0 mm was obtained.

The immersion test was performed in order to evaluate the corrosion resistance of the magnetic core sample obtained in the above. For the immersion test, the magnetic core sample was immersed in tap water, then a time which took to confirm rust formation by visual observation was measured (rust formation time). In Experiment 1, the corrosion resistance of each sample was evaluated with respect to a rust formation time T1 of the Sample No. 1 which was not performed with a heat treatment. Specifically, in Experiment 1, when a rust formation time of a sample was less than 1.3 times of T1 (the rust formation time of Sample No. 1), then it was evaluated as "F (Fail)"; when a rust formation time of a sample was 1.3 times or more and less than 1.5 times of T1, then it was evaluated as "G (Good)"; and when a rust formation time of a sample was 1.5 times or more of T1, it was evaluated as "VG (very good)". Results of the immersion test evaluated by the above-mentioned "F, G, and VG" are shown in Table 1.

TABLE 1

| | Heat treatment condition | | | | Analysis result of surface structure | | | | | |
|---|---|---|---|---|---|---|---|---|---|---|
| Sample No. | Holding Temp. ° C. | Holding time h | Oxygen concentration ppm | Gauge pressure kPa | Co concentrated area | SB concentrated area | Co concentration degree (—) | Difference between crystallized area ratios DCA(—) | Saturation magnetic flux density Bs T | Immersion test Evaluation |
| 1※ | — | — | — | — | None | Formed | — | DCA ≤ 0 | 1.73 | Standard |
| 2※ | 300 | 1.5 | 300 | 0.00 | None | Formed | — | DCA ≤ 0 | 1.75 | F |
| 3※ | 300 | 1.5 | 300 | 0.05 | Formed | Formed | 1.13 | DCA ≤ 0 | 1.75 | F |
| 4 | 300 | 1.5 | 300 | 0.15 | Formed | Formed | 1.78 | 0 < DCA | 1.75 | VG |
| 5 | 300 | 1.5 | 300 | 0.30 | Formed | Formed | 2.46 | 0 < DCA | 1.74 | VG |
| 6 | 300 | 1.5 | 300 | 0.45 | Formed | Formed | 2.97 | 0 < DCA | 1.73 | VG |
| 7 | 300 | 0.25 | 300 | 0.15 | Formed | Formed | 1.11 | 0 < DCA | 1.75 | G |
| 8 | 300 | 3.0 | 300 | 0.15 | Formed | Formed | 1.82 | 0 < DCA | 1.73 | VG |

TABLE 1-continued

| Sample No. | Heat treatment condition: Holding Temp. ° C. | Holding time h | Oxygen concentration ppm | Gauge pressure kPa | Analysis result of surface structure: Co concentrated area | SB concentrated area | Co concentration degree (—) | Difference between crystallized area ratios DCA(—) | Saturation magnetic flux density Bs T | Immersion test Evaluation |
|---|---|---|---|---|---|---|---|---|---|---|
| 9※ | 200 | 1.0 | 300 | 0.15 | Formed | Formed | 1.17 | DCA ≤ 0 | 1.75 | F |
| 10 | 300 | 1.0 | 300 | 0.15 | Formed | Formed | 2.64 | 0 < DCA | 1.74 | VG |
| 11 | 400 | 1.0 | 300 | 0.15 | Formed | Formed | 2.87 | 0 < DCA | 1.73 | VG |
| 12※ | 300 | 1.0 | 0 | 0.15 | None | Formed | — | DCA ≤ 0 | 1.75 | F |
| 13※ | 300 | 1.0 | 20 | 0.15 | None | Formed | — | DCA ≤ 0 | 1.75 | F |
| 14 | 300 | 1.0 | 100 | 0.15 | Formed | Formed | 1.12 | 0 < DCA | 1.75 | G |
| 15 | 300 | 1.0 | 500 | 0.15 | Formed | Formed | 2.01 | 0 < DCA | 1.74 | VG |
| 16 | 300 | 1.0 | 1000 | 0.15 | Formed | Formed | 2.23 | 0 < DCA | 1.72 | VG |

As shown in Table 1, in Sample No. 4 to 8, 10 to 11, and 14 to 16 which were heat treated at predetermined conditions, it was confirmed that the concentrated areas (11 to 13) were confirmed, and also a relation of 0≤DCA was satisfied. Further, for these samples, a corrosion resistance was relatively good compared to a standard alloy (Sample No. 1) while maintaining a high Bs.

Note that, in Sample No. 4 to 8, 10 to 11, and 14 to 16, it was confirmed that a perpendicular distance d1 was 30 nm or less which was a distance from the outer most surface 10 to the Co concentrated area 11. According to this result, it was proven that the corrosion resistance improved by forming the Co concentrated area 11, the SB concentrated area 12, and the Fe concentrated area 13 at a surface side of the soft magnetic alloy each satisfying the predetermined characteristics.

Experiment 2

In Experiment 2, the soft magnetic alloys of Sample No. 17 to 106 were obtained by changing the alloy compositions. The alloy composition of each sample was analyzed using ICP, and the results are shown in Table 2 to Table 7 (evaluation results of Experiment 1 are partially included).

Specifically, for Sample No. 17 to 30 shown in Table 2, each sample satisfied a compositional formula: $(Fe_{1-\alpha}Co_{\alpha})_{0.84}B_{0.11}Si_{0.03}C_{0.01}Cr_{0.01}$ (atomic ratio; β=0, γ=0, a=0.110, b=0, c=0.030, d=0.010, and e=0.010), and a Co atomic ratio a was varied, thereby the soft magnetic alloy was produced. Note that, Sample No. 23 is the same sample as Sample No. 1 of Table 1, and Sample No. 24 is the same sample as Sample No. 10 of Table 1.

Also, for the soft magnetic alloys of Sample No. 31 to 50 shown in Table 3, the atomic ratios of Co, Ni, and X1 were respectively fixed to α=0.300, β=0, and γ=0; and then the atomic ratios of metalloids (B, P, Si, and C) and Cr were varied, thereby the soft magnetic alloy was produced.

Also, for Sample No. 51 to 54 shown in Table 4, each sample satisfied a compositional formula: $(Fe_{(1-(0.3+\beta)}Co_{0.3}Ni_{\beta})_{0.84}B_{0.11}Si_{0.03}C_{0.01}Cr_{0.01}$ (atomic ratios: α=0.300, γ=0, a=0.110, b=0, c=0.030, d=0.010, and e=0.010), and a Ni atomic ratio β was varied, thereby the soft magnetic alloy was produced.

Also, for Sample No. 55 to 106 shown in Table 5 to Table 7, each sample satisfied a compositional formula: $((Fe_{0.7}Co_{0.3})_{0.975}X1_{0.025})_{0.84}B_{0.11}Si_{0.03}C_{0.01}Cr_{0.01}$ (atomic ratios; α=0.300, β=0, γ=0.025, a=0.110, b=0, c=0.030, d=0.010, and e=0.010), and a type of X1 element was varied, thereby the soft magnetic alloy was produced.

Note that, all of the soft magnetic alloys of Experiment 2 had an amorphous degree X of 85% or more. Also, in Experiment 2, for each alloy composition, a sample performed with a predetermined heat treatment and a sample without the predetermined heat treatment were formed; and in Table 2 to Table 7, the sample performed with the heat treatment was shown as "Y", and the sample without the heat treatment was shown as "N". Also, conditions of the heat treatment of Experiment 2 were a holding temperature: 300° C., a holding time: 1 h, an oxygen concentration in a heating furnace: 300 ppm, and a gauge pressure in the heating furnace: 0.15 kPa.

Also, for each of Sample No. 17 to 106 of Experiment 2, as similar to Experiment 1, Bs was measured and the immersion test was performed. In the immersion test of Experiment 2, for the same composition, the rust formation time of a sample without the heat treat was defined as $T_N$, and the rust formation time of a sample performed with the heat treatment was defined as $T_Y$, then a sample which showed $T_Y/T_N<1.3$ was evaluated as "F (Fail)", a sample which showed $1.3<T_Y/T_N<1.5$ was evaluated as "G (Good)", and a sample which showed $1.5\leq T_Y/T_N$ was evaluated "VG (Very Good)". Evaluation results are shown in Table 2 to Table 7.

TABLE 2

| Sample No. | Alloy composition: $(Fe_{(1-\alpha)}Co_{\alpha})_{(1-(a+b+c+d+e))}B_aP_bSi_cC_dCr_e$ (β = 0, γ = 0): Co α | B a | P b | Si c | C d | Cr e | Heat treated or not Y or N | Analysis result of surface structure: Co concentrated area | SB concentrated area | Co concentration degree (—) | Difference between crystallized area ratios DCA(—) | Saturation magnetic flux density Bs T | Immersion test Evaluation result |
|---|---|---|---|---|---|---|---|---|---|---|---|---|---|
| 17※ | 0.05 | 0.11 | 0 | 0.03 | 0.01 | 0.01 | N | None | Formed | — | DCA ≤ 0 | 1.68 | standard |
| 18 | 0.05 | 0.11 | 0 | 0.03 | 0.01 | 0.01 | Y | Formed | Formed | 3.72 | 0 < DCA | 1.71 | VG |

TABLE 2-continued

| | Alloy composition: $(Fe_{(1-\alpha)}Co_{\alpha})_{(1-(a+b+c+d+e))}B_aP_bSi_cC_dCr_e$ (β = 0, γ = 0) | | | | | | | Analysis result of surface structure | | | | | |
|---|---|---|---|---|---|---|---|---|---|---|---|---|---|
| Sample No. | Co α | B a | P b | Si c | C d | Cr e | Heat treated or not Y or N | Co concentrated area | SB concentrated area | Co concentration degree (—) | Difference between crystallized area ratios DCA(—) | Saturation magnetic flux density Bs T | Immersion test Evaluation result |
| 19※ | 0.10 | 0.11 | 0 | 0.03 | 0.01 | 0.01 | N | None | Formed | — | DCA ≤ 0 | 1.69 | standard |
| 20 | 0.10 | 0.11 | 0 | 0.03 | 0.01 | 0.01 | Y | Formed | Formed | 5.61 | 0 < DCA | 1.70 | VG |
| 21※ | 0.15 | 0.11 | 0 | 0.03 | 0.01 | 0.01 | N | None | Formed | — | DCA ≤ 0 | 1.69 | standard |
| 22 | 0.15 | 0.11 | 0 | 0.03 | 0.01 | 0.01 | Y | Formed | Formed | 3.91 | 0 < DCA | 1.70 | VG |
| 23※ (1) | 0.30 | 0.11 | 0 | 0.03 | 0.01 | 0.01 | N | None | Formed | — | DCA ≤ 0 | 1.73 | standard |
| 24(10) | 0.30 | 0.11 | 0 | 0.03 | 0.01 | 0.01 | Y | Formed | Formed | 2.64 | 0 < DCA | 1.74 | VG |
| 25※ | 0.50 | 0.11 | 0 | 0.03 | 0.01 | 0.01 | N | None | Formed | — | DCA ≤ 0 | 1.63 | standard |
| 26 | 0.50 | 0.11 | 0 | 0.03 | 0.01 | 0.01 | Y | Formed | Formed | 2.07 | 0 < DCA | 1.62 | VG |
| 27※ | 0.60 | 0.11 | 0 | 0.03 | 0.01 | 0.01 | N | None | Formed | — | DCA ≤ 0 | 1.59 | standard |
| 28 | 0.60 | 0.11 | 0 | 0.03 | 0.01 | 0.01 | Y | Formed | Formed | 1.84 | 0 < DCA | 1.60 | VG |
| 29※ | 0.70 | 0.11 | 0 | 0.03 | 0.01 | 0.01 | N | None | Formed | — | DCA ≤ 0 | 1.53 | standard |
| 30 | 0.70 | 0.11 | 0 | 0.03 | 0.01 | 0.01 | Y | Formed | Formed | 1.77 | 0 < DCA | 1.53 | VG |

TABLE 3

| | Alloy composition: $(Fe_{(1-\alpha)}Co_{\alpha})_{(1-(a+b+c+d+e))}B_aP_bSi_cC_dCr_e$ (β = 0, γ = 0) | | | | | | | Analysis result of surface structure | | | | | |
|---|---|---|---|---|---|---|---|---|---|---|---|---|---|
| Sample No. | Co α | P a | P b | Si c | C d | Cr e | Heat treated or not Y or N | Co concentrated area | SB concentrated area | Co concentration degree (—) | Difference between crystallized area ratios DCA(—) | Saturation magnetic flux density Bs T | Immersion test Evaluation |
| 31※ | 0.300 | 0.020 | 0.040 | 0.030 | 0.010 | 0.010 | N | None | Formed | — | DCA ≤ 0 | 1.78 | standard |
| 32 | 0.300 | 0.020 | 0.040 | 0.030 | 0.010 | 0.010 | Y | Formed | Formed | 2.23 | 0 < DCA | 1.81 | VG |
| 33※ | 0.300 | 0.200 | 0.000 | 0.000 | 0.000 | 0.010 | N | None | Formed | — | DCA ≤ 0 | 1.52 | standard |
| 34 | 0.300 | 0.200 | 0.000 | 0.000 | 0.000 | 0.010 | Y | Formed | Formed | 2.35 | 0 < DCA | 1.55 | VG |
| 35※ | 0.300 | 0.110 | 0.030 | 0.030 | 0.010 | 0.010 | N | None | Formed | — | DCA ≤ 0 | 1.67 | standard |
| 36 | 0.300 | 0.110 | 0.030 | 0.030 | 0.010 | 0.010 | Y | Formed | Formed | 2.29 | 0 < DCA | 1.72 | VG |
| 37※ | 0.300 | 0.110 | 0.070 | 0.030 | 0.010 | 0.010 | N | None | Formed | — | DCA ≤ 0 | 1.53 | standard |
| 38 | 0.300 | 0.110 | 0.070 | 0.030 | 0.010 | 0.010 | Y | Formed | Formed | 2.48 | 0 < DCA | 1.56 | VG |
| 39※ | 0.300 | 0.140 | 0.020 | 0.000 | 0.010 | 0.010 | N | None | Formed | — | DCA ≤ 0 | 1.72 | standard |
| 40 | 0.300 | 0.140 | 0.020 | 0.000 | 0.010 | 0.010 | Y | Formed | Formed | 2.31 | 0 < DCA | 1.74 | VG |
| 41※ | 0.300 | 0.110 | 0.000 | 0.100 | 0.010 | 0.010 | N | None | Formed | — | DCA ≤ 0 | 1.55 | standard |
| 42 | 0.300 | 0.110 | 0.000 | 0.100 | 0.010 | 0.010 | Y | Formed | Formed | 2.50 | 0 < DCA | 1.59 | VG |
| 43※ | 0.300 | 0.110 | 0.000 | 0.030 | 0.000 | 0.010 | N | None | Formed | — | DCA ≤ 0 | 1.73 | standard |
| 44 | 0.300 | 0.110 | 0.000 | 0.030 | 0.000 | 0.010 | Y | Formed | Formed | 2.19 | 0 < DCA | 1.74 | VG |
| 45※ | 0.300 | 0.110 | 0.000 | 0.030 | 0.050 | 0.010 | N | None | Formed | — | DCA ≤ 0 | 1.53 | standard |
| 46 | 0.300 | 0.110 | 0.000 | 0.030 | 0.050 | 0.010 | Y | Formed | Formed | 2.52 | 0 < DCA | 1.56 | VG |
| 47※ | 0.300 | 0.110 | 0.000 | 0.030 | 0.010 | 0.000 | N | None | Formed | — | DCA ≤ 0 | 1.79 | standard |
| 48 | 0.300 | 0.110 | 0.000 | 0.030 | 0.010 | 0.000 | Y | Formed | Formed | 2.31 | 0 < DCA | 1.82 | VG |
| 49※ | 0.300 | 0.110 | 0.000 | 0.030 | 0.010 | 0.040 | N | None | Formed | — | DCA ≤ 0 | 1.66 | standard |
| 50 | 0.300 | 0.110 | 0.000 | 0.030 | 0.010 | 0.040 | Y | Formed | Formed | 2.34 | 0 < DCA | 1.68 | VG |

TABLE 4

| | Alloy composition: $(Fe_{(1-(\alpha+\beta))}Co_{\alpha}Ni_{\beta})_{0.840}B_{0.11}Si_{0.03}C_{0.01}Cr_{0.01}$ (γ = 0, b = 0) | | | Analysis result of surface structure | | | | | |
|---|---|---|---|---|---|---|---|---|---|
| Sample No. | Co α | Ni β | Heat treated or not Y or N | Co concentrated area | SB concentrated area | Co concentration degree (—) | Difference between crystallized area ratios DCA(—) | Saturation magnetic flux density Bs T | Immersion test Evaluation |
| 51※ | 0.300 | 0.005 | N | None | Formed | — | DCA ≤ 0 | 1.74 | Standard |
| 52 | 0.300 | 0.005 | Y | Formed | Formed | 2.07 | 0 < DCA | 1.73 | VG |
| 53※ | 0.300 | 0.200 | N | None | Formed | — | DCA ≤ 0 | 1.56 | Standard |
| 54 | 0.300 | 0.200 | Y | Formed | Formed | 1.35 | 0 < DCA | 1.56 | VG |

TABLE 5

| Sample No. | Co α | Elelemtn type | γ | Heat treated or not Y or N | Co concentrated area | SB concentrated area | Co concentration degree (—) | Difference between crystallized area ratios DCA(—) | Saturation magnetic flux density Bs T | Immersion test Evaluation |
|---|---|---|---|---|---|---|---|---|---|---|
| | Alloy composition: $((Fe_{(1-\alpha)}Co_{\alpha})_{1-\gamma}X1_{\gamma})_{0.840}B_{0.11}Si_{0.03}C_{0.01}Cr_{0.01}$ ($\beta$ = 0, b = 0) | X1 | | | Analysis result of surface structure | | | | | |
| 55※ | 0.300 | Al | 0.025 | N | None | Formed | — | DCA ≤ 0 | 1.70 | Standard |
| 56 | 0.300 | Al | 0.025 | Y | Formed | Formed | 2.33 | 0 < DCA | 1.73 | VG |
| 57※ | 0.300 | Zn | 0.025 | N | None | Formed | — | DCA ≤ 0 | 1.70 | Standard |
| 58 | 0.300 | Zn | 0.025 | Y | Formed | Formed | 2.29 | 0 < DCA | 1.76 | VG |
| 59※ | 0.300 | Sn | 0.025 | N | None | Formed | — | DCA ≤ 0 | 1.69 | Standard |
| 60 | 0.300 | Sn | 0.025 | Y | Formed | Formed | 2.27 | 0 < DCA | 1.74 | VG |
| 61※ | 0.300 | Cu | 0.025 | N | None | Formed | — | DCA ≤ 0 | 1.68 | Standard |
| 62 | 0.300 | Cu | 0.025 | Y | Formed | Formed | 2.31 | 0 < DCA | 1.71 | VG |
| 63※ | 0.300 | Bi | 0.025 | N | None | Formed | — | DCA ≤ 0 | 1.69 | Standard |
| 64 | 0.300 | Bi | 0.025 | Y | Formed | Formed | 2.35 | 0 < DCA | 1.72 | VG |
| 65※ | 0.300 | La | 0.025 | N | None | Formed | — | DCA ≤ 0 | 1.59 | Standard |
| 66 | 0.300 | La | 0.025 | Y | Formed | Formed | 2.26 | 0 < DCA | 1.64 | VG |
| 67※ | 0.300 | Y | 0.025 | N | None | Formed | — | DCA ≤ 0 | 1.64 | Standard |
| 68 | 0.300 | Y | 0.025 | Y | Formed | Formed | 2.28 | 0 < DCA | 1.69 | VG |
| 69※ | 0.300 | Ga | 0.025 | N | None | Formed | — | DCA ≤ 0 | 1.64 | Standard |
| 70 | 0.300 | Ga | 0.025 | Y | Formed | Formed | 2.34 | 0 < DCA | 1.68 | VG |
| 71※ | 0.300 | Ti | 0.025 | N | None | Formed | — | DCA ≤ 0 | 1.59 | Standard |
| 72 | 0.300 | Ti | 0.025 | Y | Formed | Formed | 2.35 | 0 < DCA | 1.64 | VG |
| 73※ | 0.300 | Zr | 0.025 | N | None | Formed | — | DCA ≤ 0 | 1.60 | Standard |
| 74 | 0.300 | Zr | 0.025 | Y | Formed | Formed | 2.33 | 0 < DCA | 1.65 | VG |
| 75※ | 0.300 | Hf | 0.025 | N | None | Formed | — | DCA ≤ 0 | 1.59 | Standard |
| 76 | 0.300 | Hf | 0.025 | Y | Formed | Formed | 2.30 | 0 < DCA | 1.65 | VG |
| 77※ | 0.300 | Nb | 0.025 | N | None | Formed | — | DCA ≤ 0 | 1.59 | Standard |
| 78 | 0.300 | Nb | 0.025 | Y | Formed | Formed | 2.28 | 0 < DCA | 1.63 | VG |

TABLE 6

| Sample No. | Co α | Element type | γ | Heat treated or not Y or N | Co concentrated area | SB concentrated area | Co concentration degree (—) | Difference between crystallized area ratios DCA(—) | Saturation magnetic flux density Bs T | Immersion test Evaluation |
|---|---|---|---|---|---|---|---|---|---|---|
| | Alloy composition: $((Fe_{(1-\alpha)}Co_{\alpha})_{1-\gamma}X1_{\gamma})_{0.840}B_{0.11}Si_{0.03}C_{0.01}Cr_{0.01}$ ($\beta$ = 0, b = 0) | X1 | | | Analysis result of surface structure | | | | | |
| 79※ | 0.300 | Ta | 0.025 | N | None | Formed | — | DCA ≤ 0 | 1.59 | Standard |
| 80 | 0.300 | Ta | 0.025 | Y | Formed | Formed | 2.26 | 0 < DCA | 1.62 | VG |
| 81※ | 0.300 | Mo | 0.025 | N | None | Formed | — | DCA ≤ 0 | 1.59 | Standard |
| 82 | 0.300 | Mo | 0.025 | Y | Formed | Formed | 2.25 | 0 < DCA | 1.63 | VG |
| 83※ | 0.300 | V | 0.025 | N | None | Formed | — | DCA ≤ 0 | 1.59 | Standard |
| 84 | 0.300 | V | 0.025 | Y | Formed | Formed | 2.35 | 0 < DCA | 1.64 | VG |
| 85※ | 0.300 | W | 0.025 | N | None | Formed | — | DCA ≤ 0 | 1.59 | Standard |
| 86 | 0.300 | W | 0.025 | Y | Formed | Formed | 2.33 | 0 < DCA | 1.65 | VG |
| 87※ | 0.300 | Ca | 0.025 | N | None | Formed | — | DCA ≤ 0 | 1.67 | Standard |
| 88 | 0.300 | Ca | 0.025 | Y | Formed | Formed | 2.25 | 0 < DCA | 1.70 | VG |
| 89※ | 0.300 | Mg | 0.025 | N | None | Formed | — | DCA ≤ 0 | 1.66 | Standard |
| 90 | 0.300 | Mg | 0.025 | Y | Formed | Formed | 2.37 | 0 < DCA | 1.70 | VG |
| 91※ | 0.300 | S | 0.025 | N | None | Formed | — | DCA ≤ 0 | 1.68 | Standard |
| 92 | 0.300 | S | 0.025 | Y | Formed | Formed | 2.29 | 0 < DCA | 1.71 | VG |
| 93※ | 0.300 | N | 0.025 | N | None | Formed | — | DCA ≤ 0 | 1.68 | Standard |
| 94 | 0.300 | N | 0.025 | Y | Formed | Formed | 2.29 | 0 < DCA | 1.73 | VG |
| 95※ | 0.300 | O | 0.025 | N | None | Formed | — | DCA ≤ 0 | 1.68 | Standard |
| 96 | 0.300 | O | 0.025 | Y | Formed | Formed | 2.16 | 0 < DCA | 1.71 | VG |

TABLE 7

| Sample No. | Alloy composition: $((Fe_{(1-\alpha)}Co_{\alpha})_{1-\gamma}X1_{\gamma})_{0.840}B_{0.11}Si_{0.03}C_{0.01}Cr_{0.01}$ ($\beta = 0$, $b = 0$) Co $\alpha$ | X1 Element type | X1 $\gamma$ | Heat treated or not Y or N | Analysis result of surface structure: Co concentrated area | SB concentrated area | Co concentration degree (—) | Difference between crystallized area ratios DCA(—) | Saturation magnetic flux density Bs T | Immersion test Evaluation |
|---|---|---|---|---|---|---|---|---|---|---|
| 97※ | 0.300 | Ag | 0.025 | N | None | Formed | — | DCA ≤ 0 | 1.62 | Standard |
| 98 | 0.300 | Ag | 0.025 | Y | Formed | Formed | 2.36 | 0 < DCA | 1.65 | VG |
| 99※ | 0.300 | As | 0.025 | N | None | Formed | — | DCA ≤ 0 | 1.61 | Standard |
| 100 | 0.300 | As | 0.025 | Y | Formed | Formed | 2.41 | 0 < DCA | 1.65 | VG |
| 101※ | 0.300 | Sb | 0.025 | N | None | Formed | — | DCA ≤ 0 | 1.60 | Standard |
| 102 | 0.300 | Sb | 0.025 | Y | Formed | Formed | 2.40 | 0 < DCA | 1.61 | VG |
| 103※ | 0.300 | Au | 0.025 | N | None | Formed | — | DCA ≤ 0 | 1.62 | Standard |
| 104 | 0.300 | Au | 0.025 | Y | Formed | Formed | 2.33 | 0 < DCA | 1.65 | VG |
| 105※ | 0.300 | Pt | 0.025 | N | None | Formed | — | DCA ≤ 0 | 1.60 | Standard |
| 106 | 0.300 | Pt | 0.025 | Y | Formed | Formed | 2.35 | 0 < DCA | 1.62 | VG |

As shown in Table 2 to Table 7, in the sample which was performed with the predetermined heat treatment exhibited a higher corrosion resistance than the sample without the heat treatment. Thus, from this result, within the alloy composition range shown in Experiment 2, by forming the concentrated areas (11 to 13), the corrosion resistance was improved while maintaining a high Bs.

Also, according to the results shown in Table 1 to Table 7, it can be understood that the Co concentration degree of the Co concentrated area 11 was preferably larger than 1.20. Further, as the Co concentration degree increased, the improvement effect of the corrosion resistance with respect to the standard alloy (the sample without the heat treatment for forming the concentrated area) was further enhanced. Note that, according to the results shown in Table 2, as the Co amount increased in the internal area 2 (that is, as the Co amount of the soft magnetic alloy increased), it took longer time till the rust was formed. That is, as the Co amount in the internal area 2 increased, the corrosion resistance which is an absolute evaluation improved. Note that, as Sample No. 30 of Table 2 shows, when the Co amount in the internal area 2 was high, the Co concentration degree rather tended to decrease. Also, compared to Sample No. 30, a relative improvement effect of the corrosion resistance (that is, the corrosion resistance with respect to the standard alloy) was better in Sample No. 18, 20, 22, 24, 26, and 28 which had high Co concentration degree.

Experiment 3

In Experiment 3, an amorphous soft magnetic alloy powder having the amorphous degree X of 85% or more (Sample No. 1 and 10), and a nanocrystal soft magnetic alloy powder having the amorphous degree X of less than 85% (Sample No. 107 and 108), and a crystalline soft magnetic alloy powder having the amorphous degree X of less than 85% (Sample No. 109 and 110) were produced. Then, the influence to the corrosion resistance due to the difference in the crystal structures of the soft magnetic alloys was examined.

In Experiment 3, the crystal structure of each sample was regulated by a pre-heat treatment. Specifically, in Sample No. 1 and 10 of Experiment 3, an amorphous soft magnetic alloy powder was obtained since the per-heat treatment was not performed. Also, in Sample No. 107 and 108 of Experiment 3, by performing the pre-heat treatment at a holding temperature: 500° C., a nanocrystal soft magnetic alloy powder was obtained. Also, in Sample No. 109 and 110 of Experiment 3, by performing the pre-heat treatment at a holding temperature: 650° C., a crystalline soft magnetic alloy powder was obtained. Note that, other conditions of the above-mentioned pre-heat treatment were, a temperature increasing rate: 100° C./min, a furnace atmosphere: Ar atmosphere, and a gauge pressure inside the heating furnace: 0.0 kPa, thereby the crystal structure was controlled in a state which did not form the Co concentrated area.

The composition of the soft magnetic alloy of each sample of Experiment 3 was $(Fe_{0.7}Co_{0.3})_{0.84}B_{0.11}Si_{0.03}C_{0.01}Cr_{0.01}$. Also, in Experiment 3, for each crystal structure, a sample carried out with the heat treatment for forming each concentrated area (11 to 13), and a sample without the heat treatment were produced. In Table 8, the sample performed with the heat treatment was shown as "Y", and the sample without the heat treatment was shown as "N". Note that, for samples which were performed with the pre-heat treatment (Sample No. 108 and 110), the heat treatment for forming each concentrated area was performed after the pre-heat treatment. Also, conditions of the heat treatment of Experiment 3 were a holding temperature: 300° C., a holding time: 1.0 h, an oxygen concentration in a heating furnace: 300 ppm, and a gauge pressure in the heating furnace: 0.15 kPa.

Also, in Experiment 3 as similar to Experiment 2, Bs was measured and the immersion test was performed. Regarding the immersion test of Experiment 3, for the same crystal structure, the rust formation time of a sample without the heat treat was defined as $T_N$, and the rust formation time of a sample performed with the heat treatment was defined as $T_Y$, then a sample which showed $T_Y/T_N<1.3$ was evaluated as "F (Fail)", a sample which showed $1.3 \le T_Y/T_N<1.5$ was evaluated as "G (Good)", and a sample which showed $1.5 \le T_Y/T_N$ was evaluated "VG (Very Good)". Evaluation results are shown in Table 8.

TABLE 8

| Sample No. | Alloy composition: $(Fe_{(1-\alpha)}Co_{\alpha})_{(1-(a+b+c+d+e))}B_aP_bSi_cC_dCr_e$ (β = 0, γ = 0) Co α | B a | P b | Si c | C d | Cr e | Crystal structure of alloy powder (before low temp. oxidation treatment) (—) | Heat treated or not Y or N | Analysis result of surace structure: Co concentrated area | Analysis result of surace structure: SB concentrated area | Analysis result of surace structure: Co concentration degree (—) | Analysis result of surace structure: Difference between crystallized area ratios DCA(—) | Saturation magnetic flux density Bs T | Immersion test Evaluation |
|---|---|---|---|---|---|---|---|---|---|---|---|---|---|---|
| 1※ | 0.30 | 0.11 | 0 | 0.03 | 0.01 | 0.01 | Amorphous | N | None | Formed | — | DCA ≤ 0 | 1.73 | Standard |
| 10 | 0.30 | 0.11 | 0 | 0.03 | 0.01 | 0.01 | Amorphous | Y | Formed | Formed | 2.64 | 0 < DCA | 1.74 | VG |
| 107※ | 0.30 | 0.11 | 0 | 0.03 | 0.01 | 0.01 | Nanocrystal | N | None | Formed | — | DCA ≤ 0 | 1.75 | Standard |
| 108 | 0.30 | 0.11 | 0 | 0.03 | 0.01 | 0.01 | Nanocrystal | Y | Formed | Formed | 2.57 | 0 < DCA | 1.75 | VG |
| 109※ | 0.30 | 0.11 | 0 | 0.03 | 0.01 | 0.01 | Crystalline | N | None | Formed | — | DCA ≤ 0 | 1.83 | Standard |
| 110 | 0.30 | 0.11 | 0 | 0.03 | 0.01 | 0.01 | Crystalline | Y | Formed | Formed | 2.32 | 0 < DCA | 1.83 | VG |

Table 8 shows that, as similar to the amorphous soft magnetic alloy, in the nanocrystal or crystalline soft magnetic alloy, Sample No. 108 and 110 which were formed with the concentrated areas (11 to 13) by performing the predetermined heat treatment showed improved corrosion resistance compared to Sample No. 107 and 109 which were not heat treated. Also, by comparing the results of Sample No. 107 to 110 shown in Table 8 and the results of Sample No. 1 and 10, it can be understood that when the soft magnetic alloy was amorphous, the improvement effect of the corrosion resistance was particularly good.

Experiment 4

In Experiment 4, the soft magnetic alloy sample of a ribbon form (Sample No. 111 and 112) were produced by using a single roll method. Conditions for forming a ribbon were, a temperature of a molten sprayed to a roll: 1300° C., a roll temperature: 30° C., and a roll rotation speed: 25 m/sec. Also, the inside of the chamber was air atmosphere. The soft magnetic alloy ribbon obtained under the above-mentioned conditions had a thickness of 20 to 25 μm, a width in a short direction of about 5 mm, and a length of ribbon of about 10 m.

Also, in Experiment 4, as similar to Experiment 1, the alloy compositions of Sample No. 111 and 112 were measured using ICP, and it was confirmed that both samples satisfied the compositional formula: $(Fe_{0.7}Co_{0.3})_{0.84}B_{0.11}Si_{0.03}C_{0.01}Cr_{0.01}$ (atomic ratios; α=0.300, β=0, γ=0, a=0.110, b=0, c=0.030, d=0.010, and e=0.010). Further, when the crystal structure of the soft magnetic alloy ribbons of Sample No. 111 and 112 were measured using XRD, the amorphous crystal structure was confirmed which had the amorphous degree X: 85% or higher in both of Sample No. 111 and 112.

For the soft magnetic alloy ribbon of Sample No. 111, the heat treatment was not performed, and an analysis of the surface structure, Bs measurement, and the immersion test were performed. On the other hand, the soft magnetic alloy ribbon of Sample No. 112 was performed with a heat treatment under the conditions shown in Table 9, and the same evaluations as for Sample No. 111 were carried out. Note that, in the immersion test of the soft magnetic alloy ribbon, the ribbon was cut into an arbitrary size (a length of about 4 cm×a width of about 5 mm) to prepare a sample for immersion test. Then, the sample of a ribbon form for immersion test was immersed in tab water. Results of the immersion test of Experiment 4 were evaluated as same as Experiment 1. The evaluation result of each sample of Experiment 4 is shown in Table 9. Note that, Table 9 includes the experiment results of the soft magnetic alloy powders (Sample No. 1 and 10 of Experiment 1) having the same alloy compositions as Sample No. 111 and 112.

TABLE 9

| | | Heat treatment condition | | | | Analysis result of surface structure | | | | | |
|---|---|---|---|---|---|---|---|---|---|---|---|
| Sample No. | Shape of soft magnetic alloy | Holding Temp. ° C. | Holding time h | Oxygen concentration ppm | Gauge pressure kPa | Co concentrated area | SB concentrated area | Co concentration degree (—) | Difference between crystallized area ratios DCA(—) | Saturation magnetic flux density Bs T | Immersion test Evaluation |
| 1※ | Powder | — | — | — | — | None | Formed | — | DCA ≤ 0 | 1.73 | Standard |
| 10 | Powder | 300 | 1.0 | 300 | 0.15 | Formed | Formed | 2.64 | 0 < DCA | 1.74 | VG |
| 111※ | Ribbon | — | — | — | — | None | Formed | — | DCA ≤ 0 | 1.73 | Standard |
| 112 | Ribbon | 300 | 1.5 | 300 | 0.15 | Formed | Formed | 2.71 | 0 < DCA | 1.75 | VG |

As shown in Table 9, when the soft magnetic alloy was a ribbon form, by forming the concentrated areas 11 to 13 by performing the predetermined heat treatment, the corrosion resistance can be improved while maintaining a high Bs.

NUMERICAL REFERENCES

1, 1*b* . . . Soft magnetic alloy
2 . . . Internal area
10 . . . Outermost surface
11 . . . Co concentrated area
12 . . . SB concentrated area
13 . . . Fe concentrated area
20 . . . Coating layer

What is claimed is:

1. A soft magnetic alloy comprising an internal area having a soft magnetic type alloy composition including Fe and Co, a Co concentrated area existing closer to a surface side than the internal area and having a higher Co concentration than in the internal area, a SB concentrated area existing closer to the surface side than the Co concentrated area and having a higher concentration of at least one element selected from Si and B than in the internal area, and a Fe concentrated area including Fe existing closer to the surface side than the SB concentrated area; wherein a crystalized area ratio of the SB concentrated area represented by $S_{SB}^{cry}/S_{SB}$ and a crystalized area ratio of the Fe concentrated area represented by $S_{Fe}^{cry}/S_{Fe}$ satisfy a relation of $(S_{SB}^{cry}/S_{SB})<(S_{Fe}^{cry}/S_{Fe})$.

2. The soft magnetic alloy according to claim 1, wherein the SB concentrated area comprises an amorphous oxide phase.

3. The soft magnetic alloy according to claim 1, wherein the Co concentrated area comprises a metal phase.

4. The soft magnetic alloy according to claim 1, wherein a Co concentration degree of the Co concentrated area is larger than 1.2.

5. The soft magnetic alloy according to claim 1 having an amorphous degree of 85% or more.

6. The soft magnetic alloy according to claim 1 being a ribbon form.

7. The soft magnetic alloy according to claim 1 being a powder form.

8. A magnetic component including a soft magnetic alloy according to claim 1.

* * * * *